(12) United States Patent
Xu et al.

(10) Patent No.: US 11,836,943 B2
(45) Date of Patent: Dec. 5, 2023

(54) VIRTUAL FACE MODEL CREATION BASED ON KEY POINT

(71) Applicant: Beijing Sensetime Technology Development Co., Ltd., Beijing (CN)

(72) Inventors: Shengwei Xu, Beijing (CN); Quan Wang, Beijing (CN); Jingtan Piao, Beijing (CN); Chen Qian, Beijing (CN)

(73) Assignee: Beijing Sensetime Technology Development Co., Ltd., Beijing (CN)

( * ) Notice: Subject to any disclaimer, the term of this patent is extended or adjusted under 35 U.S.C. 154(b) by 0 days.

(21) Appl. No.: 17/212,523

(22) Filed: Mar. 25, 2021

(65) Prior Publication Data

US 2021/0209851 A1    Jul. 8, 2021

Related U.S. Application Data

(63) Continuation of application No. PCT/CN2020/076134, filed on Feb. 21, 2020.

(30) Foreign Application Priority Data

May 15, 2019   (CN) .......................... 201910403884.8

(51) Int. Cl.
*G06F 3/01*     (2006.01)
*G06T 7/73*     (2017.01)
(Continued)

(52) U.S. Cl.
CPC .................. *G06T 7/73* (2017.01); *G06T 7/74* (2017.01); *G06T 13/40* (2013.01); *G06T 17/20* (2013.01);
(Continued)

(58) Field of Classification Search
None
See application file for complete search history.

(56) References Cited

U.S. PATENT DOCUMENTS

2007/0183653 A1    8/2007   Medioni et al.
2008/0037836 A1    2/2008   Chen et al.
(Continued)

FOREIGN PATENT DOCUMENTS

CN    106652025 A    5/2017
CN    107025678 A    8/2017
(Continued)

OTHER PUBLICATIONS

State Intellectual Property Office of the People's Republic of China, Office Action and Search Report Issued in Application No. 201910403884.8, dated Sep. 14, 2021, 10 pages.
(Continued)

*Primary Examiner* — Hilina K Demeter

(57) ABSTRACT

The present application provides a method and apparatus of creating a face model, and an electronic device. The method includes: obtaining at least one key point feature of an current face image by performing key point detection on the current face image; obtaining a target bone parameter set matching the current face image according to the at least one key point feature; and creating a virtual three-dimensional face model corresponding to the current face image according to the target bone parameter set and a standard three-dimensional face model.

18 Claims, 9 Drawing Sheets

(51) Int. Cl.
  *G06T 13/40* (2011.01)
  *G06T 17/20* (2006.01)
  *G06V 40/16* (2022.01)
  *G06V 10/764* (2022.01)
  *G06V 20/64* (2022.01)

(52) U.S. Cl.
  CPC .......... *G06V 10/764* (2022.01); *G06V 20/653* (2022.01); *G06V 40/165* (2022.01); *G06V 40/171* (2022.01); *G06V 40/172* (2022.01); *G06T 2207/30201* (2013.01)

(56) References Cited

U.S. PATENT DOCUMENTS

| | | | | |
|---|---|---|---|---|
| 2012/0027269 | A1* | 2/2012 | Fidaleo | G06Q 30/0268 382/118 |
| 2019/0035149 | A1* | 1/2019 | Chen | G06T 15/04 |
| 2019/0266773 | A1* | 8/2019 | Orvalho | G06T 7/00 |
| 2019/0325633 | A1* | 10/2019 | Miller, IV | G06V 40/18 |
| 2019/0347803 | A1* | 11/2019 | Lim | G06T 7/11 |
| 2019/0347826 | A1* | 11/2019 | Zhang | G06V 40/23 |

FOREIGN PATENT DOCUMENTS

| | | |
|---|---|---|
| CN | 107705365 A | 2/2018 |
| CN | 109671016 A | 4/2019 |
| CN | 109685892 A | 4/2019 |
| CN | 110111418 A | 8/2019 |
| CN | 110675475 A | 1/2020 |
| JP | 2014199536 A | 10/2014 |
| JP | 2018200690 A | 12/2018 |
| KR | 20160029629 A | 3/2016 |
| KR | 20160062572 A | 6/2016 |
| KR | 20160111376 A | 9/2016 |
| KR | 101757642 B1 | 7/2017 |
| TW | I427545 B | 2/2014 |
| TW | I443601 B | 7/2014 |

OTHER PUBLICATIONS

ISA State Intellectual Property Office of the People's Republic of China, Written Opinion of the International Searching Authority Issued in Application No. PCT/CN2020/076134, dated May 20, 2020, WIPO, 13 pages.

Jiajun Yu, "Data-driven Face Cartoon and Expression Animation Generation Technology", Shanghai University, China Master's Theses Full-text Database, vol. 2, Feb. 15, 2016, 66 pages [English Abstract].

International Search Report Issued in Application No. PCT/CN2020/076134, dated May 20, 2020, 4 pages.

Office Action Issued in Taiwan Application No. 109114456, dated Nov. 30, 2020, 16 pages.

Office Action and Search Report Issued in Chinese Application No. 2019104038848, dated Mar. 19, 2021, 24 pages.

Jiajun Yu, "Data-driven Face Cartoon and Expression Animation Generation Technology", China Master's Theses Full-text Database, vol. 2, Feb. 15, 2017, 8 pages.

Japanese Patent Office, Office Action Issued in Application No. 2021-516410, dated May 6, 2022, 4 pages.

Taiwan Patent Office, Office Action Issued in Application No. 109114456, dated Apr. 27, 2022, 6 pages.

Taiwan Office Action Issued in Application No. 109114456, dated Apr. 6, 2021, 7 pages.

Korean Intellectual Property Office, Office Action Issued in Application No. 10-2021-7008646, dated Aug. 29, 2022, 15 pages.

\* cited by examiner

Twelve eyebrow shapes

VIRTUAL FACE MODEL CREATION BASED ON KEY POINT

CROSS-REFERENCE TO RELATED APPLICATION

This is a continuation application of International Patent Application No. PCT/CN2020/076134, filed on Feb. 21, 2020, which is based on and claims priority to and benefits of Chinese Patent Application No. 201910403884.8, filed on May 15, 2019. The entire content of all of the above-identified applications is incorporated herein by reference.

TECHNICAL FIELD

The present application relates to the technical field of three-dimensional modeling, and in particular, to methods and apparatuses of creating a face model, and electronic devices.

BACKGROUND

With the development of mobile terminal and computer technologies, users of application programs such as game and virtual social applications has gradually increased. In the game and virtual social applications, people are increasingly pursuing personalized design of virtual characters, which has created a great demand for the realization of face kneading. The so-called face kneading refers to creating a three-dimensional face model of a virtual character. At present, how to improve the efficiency and accuracy of face kneading is a technology being studied by a person skilled in the art.

SUMMARY

Embodiments of the present application provide a method and apparatus of creating a face model, and an electronic device.

According to a first aspect of the embodiments of the present application, provided is a method of creating a face model, including: obtaining, by performing key point detection on a current face image, at least one key point feature of the current face image; obtaining a target bone parameter set matching the current face image according to the at least one key point feature; and creating a virtual three-dimensional face model corresponding to the current face image according to the target bone parameter set and a standard three-dimensional face model.

In combination with any method embodiment provided by the present application, the method further includes: determining a reference model database according to a preset number of face image samples and the standard three-dimensional face model, wherein the reference model database includes at least one reference key point feature determined from the preset number of face image samples and at least one reference bone parameter set, each of the at least one reference key point feature corresponds to one of the at least one reference bone parameter set. Accordingly, obtaining the target bone parameter set matching the current face image according to the at least one key point feature includes: obtaining the target bone parameter set matching the current face image from the reference model database according to the at least one key point feature.

In combination with any method embodiment provided by the present application, determining the reference model database according to the preset number of face image samples and the standard three-dimensional face model includes: obtaining a face image sample set comprising the preset number of face image samples, wherein the face image sample set includes a plurality of image styles representing at least one partial face region; creating, for each of the face image samples, a reference face model corresponding to the face image sample according to the standard three-dimensional face model, wherein the reference face model includes the at least one reference bone parameter set corresponding to the face image sample; and determining the reference model database according to the reference face model corresponding to each of the face image samples, wherein the reference model database includes a correspondence between the reference key point feature of each of the image styles representing each of the partial face regions and the reference bone parameter set.

In combination with any method embodiment provided by the present application, creating the reference face model corresponding to the face image sample according to the standard three-dimensional face model includes: obtaining, by performing normalization processing on the face image sample, a preprocessed face image conforming to a head pose and an image size of a standard face image, wherein the standard face image is a two-dimensional face image corresponding to the standard three-dimensional face model; obtaining, by performing key point detection on the preprocessed face image, a reference key point set of the face image sample, wherein the reference key point set includes reference key point combinations representing all the partial face regions in the face image sample; and adjusting a corresponding bone parameter set in the standard three-dimensional face model based on each of the reference key point combinations, so as to create the reference face model corresponding to the face image sample.

In combination with any method embodiment provided by the present application, obtaining, by performing key point detection on the current face image, at least one key point feature of the current face image includes: obtaining, by performing key point detection on the current face image, position coordinates of a present number of key points; and determining, according to the position coordinates of the present number of key points, a key point feature representing at least one partial face region in the current face image.

In combination with any method embodiment provided by the present application, determining, according to the position coordinates of the present number of key points, the key point feature representing at least one partial face region in the current face image includes: determining, based on the position coordinates of the present number of key points, a key point coordinate combination representing a first partial face region in the current face image as the key point feature representing the first partial face region, wherein the first partial face region is one of the at least one partial face region; and/or fitting, according to the key point coordinate combination representing the first partial face region, a feature curve representing the first partial face region as the key point feature representing the first partial face region.

In combination with any method embodiment provided by the present application, obtaining the target bone parameter set matching the current face image from the reference model database according to the at least one key point feature includes: determining, for each partial face region in the current face image, a reference key point feature in the reference model database matching a key point feature of the partial face region as a target reference key point feature of the partial face region; and determining the target bone parameter set of the current face image according to the reference bone parameter set corresponding to the target reference key point feature of each the partial face region in the current face image.

In combination with any method embodiment provided by the present application, determining the reference key point feature in the reference model database matching the key point feature of the partial face region as the target reference key point feature of the partial face region includes: determining a similarity between the key point feature of the partial face region and a corresponding reference key point feature in the reference model database; and determining the reference key point feature with a highest similarity as the target reference key point feature of the partial face region.

In combination with any method embodiment provided by the present application, determining the similarity between the key point feature of the partial face region and the corresponding reference key point feature in the reference model database includes: fitting a feature curve representing the partial face region according to the key point coordinate combination of the partial face region; and determining the similarity between the key point feature of the partial face region and the corresponding reference key point feature in the reference model database according to a distance between the feature curve and a corresponding reference feature curve in the reference model database.

In combination with any method embodiment provided by the present application, in a case that the partial face region includes at least two sub-regions, determining the similarity between the key point feature of the partial face region and the corresponding reference key point feature of one face image sample in the reference model database includes: determining, for each of the sub-regions in the partial face region, the similarity between the key point feature of the sub-region and the reference key point feature of a corresponding sub-region of the face image sample in the reference model database, so as to obtain a partial similarity corresponding to the sub-region; and determining, according to the partial similarity corresponding to each of the sub-regions, an overall similarity between the partial face region and a corresponding partial face region in the face image sample as the similarity between the key point feature of the partial face region and the corresponding reference key point feature of the face image sample in the reference model database.

According to a second aspect of the embodiments of the present application, provided is an apparatus of creating a face model, including: a key point detection module, configured to obtain, by performing key point detection on a current face image, at least one key point feature of the current face image; a parameter matching module, configured to obtain a target bone parameter set matching the current face image according to the at least one key point feature; and a model creation module, configured to create a virtual three-dimensional face model corresponding to the current face image according to the target bone parameter set and a standard three-dimensional face model.

In combination with any apparatus embodiment provided by the present application, the apparatus further includes: a database creation module, configured to determine a reference model database according to a preset number of face image samples and the standard three-dimensional face model, wherein the reference model database includes at least one reference key point feature determined from the preset number of face image samples and at least one reference bone parameter set, each of the at least one reference key point feature corresponds to one of the at least one reference bone parameter set. In this case, the parameter matching module is specifically configured to: obtain the target bone parameter set matching the current face image from the reference model database according to the at least one key point feature.

In combination with any apparatus embodiment provided by the present application, the database creation module includes: a sample obtaining sub-module, configured to obtain a face image sample set comprising the preset number of face image samples, wherein the face image sample set includes a plurality of image styles representing at least one partial face region; a reference model creation sub-module, configured to create, for each of the face image samples, a reference face model corresponding to the face image sample according to the standard three-dimensional face model, wherein the reference face model includes the at least one reference bone parameter set corresponding to the face image sample; and a database determination sub-module, configured to determine the reference model database according to the reference face model corresponding to each of the face image samples, wherein the reference model database includes a correspondence between the reference key point feature of each of the image styles representing each of the partial face regions and the reference bone parameter set.

In combination with any apparatus embodiment provided by the present application, the reference model creation sub-module includes: an image preprocessing unit, configured to obtain, by performing normalization processing on one of the face image samples, a preprocessed face image conforming to a head pose and an image size of a standard face image, wherein the standard face image is a two-dimensional face image corresponding to the standard three-dimensional face model; a key point detection unit, configured to obtain, by performing key point detection on the preprocessed face image, a reference key point set of the face image sample, wherein the reference key point set includes reference key point combinations representing all the partial face regions in the face image sample; and a reference model creation unit, configured to adjust a corresponding bone parameter set in the standard three-dimensional face model based on each of the reference key point combinations, so as to create the reference face model corresponding to the face image sample.

In combination with any apparatus embodiment provided by the present application, the key point detection module includes: a key point localization sub-module, configured to obtain, by performing key point detection on the current face image, position coordinates of a present number of key points; and a key point feature determination sub-module, configured to determine, according to the position coordinates of the present number of key points, a key point feature representing at least one partial face region in the current face image.

In combination with any apparatus embodiment provided by the present application, the key point feature determination sub-module includes: a coordinate combination determination unit, configured to determine, based on the position coordinates of the present number of key points, a key point coordinate combination representing a first partial face region in the current face image as the key point feature representing the first partial face region, wherein the first partial face region is one of the at least one partial face region; and/or a feature curve determination unit, configured to fit, according to the key point coordinate combination representing the first partial face region, a feature curve representing the first partial face region as the key point feature representing the first partial face region.

In combination with any apparatus embodiment provided by the present application, the parameter matching module includes: a feature matching sub-module, configured to determine, for each partial face region in the current face image, a reference key point feature in the reference model database matching a key point feature of the partial face region as a target reference key point feature of the partial face region; and a bone parameter determination sub-module, configured to determine the target bone parameter set of the current face image according to the reference bone parameter set corresponding to the target reference key point feature of each the partial face region in the current face image.

In combination with any apparatus embodiment provided by the present application, the feature matching sub-module includes: a similarity determination unit, configured to determine a similarity between the key point feature of the partial face region and a corresponding reference key point feature in the reference model database; and a target feature determination unit, configured to determine the reference key point feature with a highest similarity as the target reference key point feature of the partial face region.

In combination with any apparatus embodiment provided by the present application, the similarity determination unit includes: a curve fitting subunit, configured to fit a feature curve representing the partial face region according to the key point coordinate combination of the partial face region; and a similarity determination subunit, configured to determine the similarity between the key point feature of the partial face region and the corresponding reference key point feature in the reference model database according to a distance between the feature curve and a corresponding reference feature curve in the reference model database.

In combination with any apparatus embodiment provided by the present application, the similarity determination unit includes: a partial similarity determination subunit, configured to determine, in a case that the partial face region includes at least two sub-regions, for each of the sub-regions in the partial face region and for each face image sample in the reference model database, the similarity between the key point feature of the sub-region and the reference key point feature of a corresponding sub-region of the face image sample in the reference model database, so as to obtain a partial similarity corresponding to the sub-region; and an overall similarity determination subunit, configured to determine, for each face image sample in the reference model database, an overall similarity between the partial face region and a corresponding partial face region in the face image sample as the similarity between the key point feature of the partial face region and the corresponding reference key point feature of the face image sample in the reference model database according to the partial similarity corresponding to each of the sub-regions.

According to a third aspect of the embodiments of the present application, provided is a computer-readable storage medium, wherein the storage medium stores a computer program, and the computer program is executed by a processor to cause the processor to implement the method according to any item of the above-mentioned first aspect.

According to a fourth aspect of the embodiments of the present disclosure, provided is an electronic device, including: a memory; a processor; and a computer program stored on the memory and executable on the processor, wherein the program is executed by the processor to cause the processor to implement the method according to any item of the above-mentioned first aspect.

By using the method of creating a face model provided by the embodiments of the present application, a computer system automatically obtains a target bone parameter set corresponding to a face image based on a key point feature representing a partial face region, and automatically adjusts a bone parameter set of a standard three-dimensional face model according to the target bone parameter set, so that a virtual three-dimensional face model adapted to the current face image may be automatically created. In the entire model creation process, it is unnecessary for users to constantly try to manually adjust complicated bone parameter sets according to their subjective judgment, thereby reducing the difficulty of user operations.

In some embodiments, the computer system may pre-configure the reference model database, and then quickly match the target bone parameter set corresponding to the face image from the reference model database. The regularity of the face partial region features makes the data volume of the reference model database small, so that the computer system may quickly match the target bone parameter set from the reference model database according to the key point feature of the current face image, and thus, a virtual three-dimensional face model matching the current face image may be efficiently and relatively accurately created by using the target bone parameter set.

It should be understood that the above general description and the following detailed description are merely exemplary and explanatory and are not intended to limit the present application.

BRIEF DESCRIPTION OF THE DRAWINGS

The accompanying drawings, which are incorporated in and constitute a part of the specification, illustrate embodiments consistent with the present application and, together with the specification, serve to explain the principles of the present application.

FIGS. 3-1 and 3-2 are schematic diagrams of application scenarios for creating a face model according to another exemplary embodiment of the present application.

FIGS. 9-1, 9-2, and 9-3 are schematic diagrams of application scenarios for creating a face model according to another exemplary embodiment of the present application.

DETAILED DESCRIPTION

Exemplary embodiments will be described here in detail, and examples thereof are represented in the accompanying drawings. When the following description relates to the accompanying drawings, unless otherwise indicated, the same numbers in different accompanying drawings represent the same or similar elements. Implementations described in the following exemplary embodiments do not represent all implementations consistent with the present application. On the contrary, they are only examples for apparatuses and methods consistent in some aspects of the present application as detailed in the attached claims.

Terms used in the present application are merely for the purpose of describing a specific embodiment, and are not intended to limit the present application. "A" and "the" in a single form used in the present application and the attached claims also aim at including a plural form, unless other meanings are clearly represented in the context. It should also be understood that the term "and/or" used herein refers to any or all possible combinations including one or more associated listed items.

It should be understood that the present application may use terms such as first, second, and third to describe information, but these information are not limited to these terms. These terms are only used to differentiate information of a same type. For example, in the case of not departing from the scope of the present application, the first information may also be referred to as the second information; similarly, the second information may also be referred to as the first information. Depending on the context, for example, the word "if" used here may be explained as "while" or "when" or "in response to determining".

Driven by the game industry and virtual reality, digital virtual characters have been widely applied. Taking a game application scenario as an example, the "virtual character" has evolved from a single virtual image to a character designed by the player himself, thereby allowing the creation of a more personalized character image.

In the embodiments of the present application, provided is a method of creating a three-dimensional face model of a virtual character based on a virtual bone control approach. An executive body involved in the method may include a computer system, and may also include a camera to acquire face images.

The above computer system may be provided in a server, a server cluster or a cloud platform, and may also be an electronic device such as a personal computer and a mobile terminal. The above mobile terminal may be specifically an electronic device such as a smart phone, a Personal Digital Assistant (PDA), a tablet computer, or a game machine. In a specific implementation process, the camera and the computer system are independent of each other and are also associated with each other, so as to jointly implement the method of creating a face model provided by the embodiments of the present application.

Figure 1:
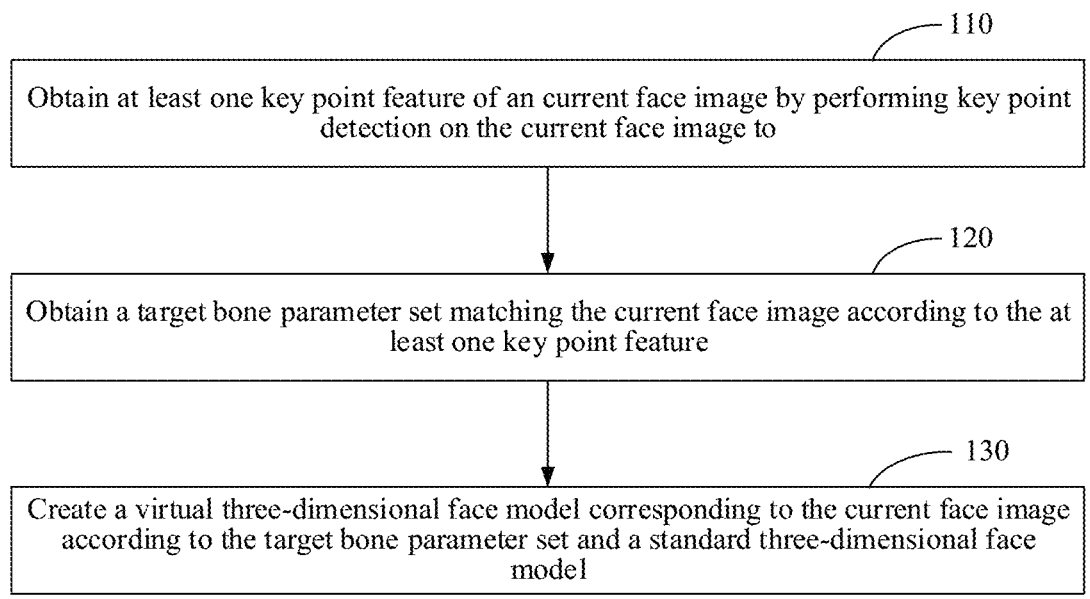
FIG. 1 is a flow chart of a method of creating a face model according to one exemplary embodiment of the present application.

Referring to FIG. 1 which is a flow chart of a method of creating a face model according to an exemplary embodiment, the method may include step 110 to step 130.

At step 110, at least one key point feature of an current face image is obtained by performing key point detection on the current face image. Each of the key point features may represent one or more partial face regions on the current face image.

Taking a game scene as an example, a game application interface may provide a user operation entry. In this way, a game player may input a face image through the user operation entry, to expect that a background program of the computer system may create a corresponding virtual three-dimensional face model according to the face image. In other words, the computer system may create a virtual three-dimensional face model based on a face image input by the game player through a face kneading function to satisfy the personalized needs of the game player for a game character.

The above current face image may be captured by the game player, and may also be selected by the game player from an image database. The current face image may be an image captured for a person in the real world, and may also be a virtual character portrait designed manually or using drawing software. The embodiments of the present application do not limit the acquisition approach of the current face image and the real existence of the character in the image in the real world.

Accordingly, after receiving the current face image input by the user, the computer system may first perform normalization processing on the current face image to obtain a face region image having a preset head pose and a preset image size. For example, processing such as face detection, face posture correction, and image scaling is performed by using a pre-trained neural network to obtain a face image having the preset image size and conforming to the preset head pose.

Then, the computer system may use any face key point detection method well known to a person skilled in the art to perform key point detection on the pre-processed face region image to obtain the key point feature of the current face image.

In the present application, the key point feature of the current face image may include position coordinate information of key points, or may also include a feature curve which is fitted according to the position coordinate information of a plurality of key points and which represents the partial face region, for example, contour lines such as an eyelid line and an lip line.

At step 120, a target bone parameter set matching the current face image is obtained according to the key point feature.

According to one example, step 120 may specifically include: obtaining the target bone parameter set matching the current face image from a reference model database according to the key point feature. The reference model database includes reference key point features determined from a preset number of face image samples and reference bone parameter sets corresponding to their respective reference key point features.

Figure 2:
FIG. 2 is a schematic diagram of an application scenario for creating a face model according to one exemplary embodiment of the present application.

In the present application, in view of the strong regularity of the five sense organs of a human face, each face part may be represented by a limited number of image styles. For example, eye features of most people may be expressed through a limited number of eye shapes; eyebrow features of most people may be represented by a limited number of eyebrow style images. As shown in FIG. 2, using twelve eyebrow shapes may cover the eyebrow features of the faces of most people.

On this basis, in the embodiments of the present application, the computer system may determine the reference model database based on a certain number of face image samples in advance. The reference model database includes the reference key point features determined from the face image samples and the reference bone parameter sets corresponding to their respective reference key point features, and the reference bone parameter sets may be configured to render a reference face model of the face image samples.

After obtaining the key point feature of the current face image, the computer system may find out the reference key point feature that is most similar to the key point feature as the target reference key point feature, and then obtain the reference bone parameter set corresponding to the target reference key point feature from the reference model database as the target bone parameter set adapted to the current face image.

It should be noted that the present application does not limit the data structure of the reference model database. For example, the reference model database may include reference bone parameter sets which are configured to render the reference face model of the face image samples and a correspondence between the reference key point features obtained from the face image samples and the reference bone parameter sets.

After the key point feature of the current face image is determined, the key point feature representing the preset partial face region may be used to match the reference model database, to obtain therefrom the reference bone parameter set corresponding to the key point feature as the target bone parameter set of the partial face region in the current face image. According to the above approach, the target bone parameter set of each partial face region in the current face image, such as the target bone parameter sets of the eyes, mouth, eyebrows, nose, and face contour, may be obtained so as to obtain a group of target bone parameter sets adapted to the current face image.

At step 130, a virtual three-dimensional face model corresponding to the current face image is created according to the target bone parameter set and a standard three-dimensional face model.

After determining the target bone parameter set corresponding to the current face image, the computer system may adjust the parameters of the bones in the standard three-dimensional face model according to the target bone parameter set, so as to render a virtual three-dimensional face model reflecting face features of the current face image.

The virtual three-dimensional face model may be a virtual three-dimensional face model which is close to the face features of an actual character, and may also be a cartoon virtual three-dimensional face model reflecting the character's expression. The embodiments of the present application do not limit that the finally output three-dimensional face model must be close to the face features of a character in the real world.

Figures 1, 3:
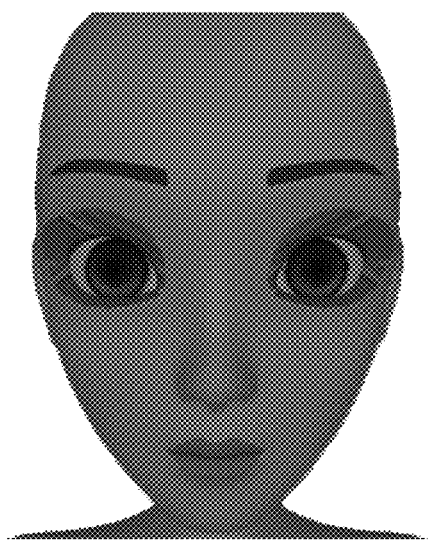
Figures 2, 3:
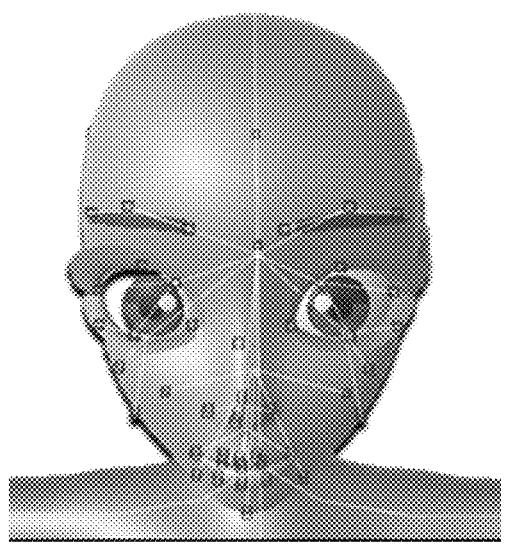

Exemplarily, referring to FIG. 3-1 which is a schematic diagram of a standard three-dimensional face model according to one exemplary embodiment, the standard three-dimensional face model is a cartoon virtual three-dimensional face model. Correspondingly, FIG. 3-2 is a schematic diagram of bones of the standard three-dimensional face mode. The whole model consists of a preset number of bone architectures, such as 61 bones. The line between every two points in FIG. 3-2 represents a bone. Each face part involves one or more bones, for example, a nose part involves three bones. By adjusting the parameters of the three bones, different types of three-dimensional nose models may be rendered.

It can be known that, in the embodiments of the present application, a computer system automatically obtains the target bone parameter set corresponding to the face image through the key point feature representing the partial face region, and automatically adjusts the bone parameter set of the standard three-dimensional face model according to the target bone parameter set, so that a virtual three-dimensional face model adapted to the current face image may be automatically created. In the entire model creation process, it is unnecessary for users to constantly try to manually adjust complicated bone parameter sets according to their subjective judgment, thereby reducing the difficulty of user operations.

Moreover, in some embodiments, the computer system may pre-configure the reference model database, and then quickly match the target bone parameter set corresponding to the face image from the reference model database. The regularity of the face partial region features makes the data volume of the reference model database small, so that the computer system may quickly match the target bone parameter set from the reference model database according to the key point feature of the current face image And thus, a virtual three-dimensional face model matching the current face image may be efficiently and relatively accurately created by using the target bone parameter set, and has good generalization.

For a case where the reference model database has not been established in the system, for example, when the system is turned on for the first time or the system is initialized, the above method further includes creating a reference model database.

Figure 4:
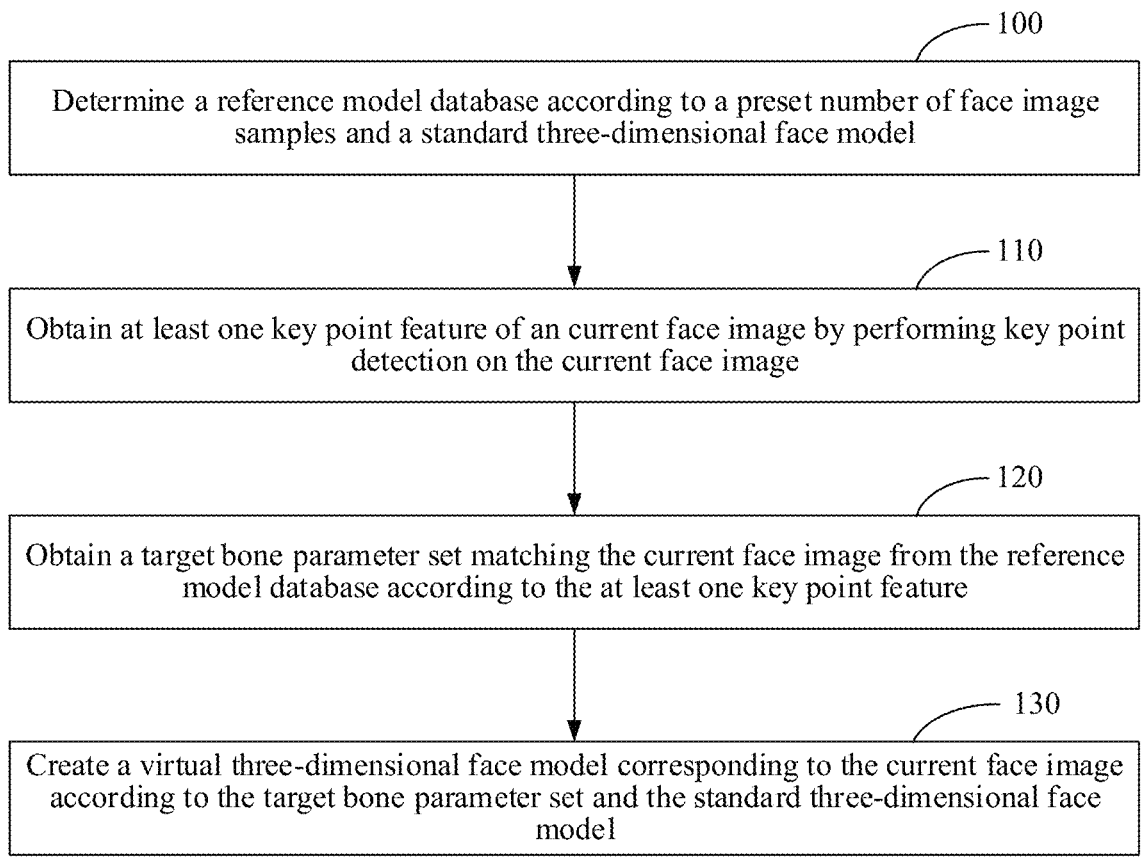
FIG. 4 is a flow chart of a method of creating a face model according to another exemplary embodiment of the present application.

Referring to FIG. 4, before step 110, the method of creating a face model may further include step 100 of determining a reference model database according to a preset number of face image samples and a standard three-dimensional face model. The reference model database includes at least one reference key point feature determined from a preset number of face image samples and at least one reference bone parameter set, each of the at least one reference key point feature corresponds to one of the at least one reference bone parameter set. Further, step 120 may include: obtaining the target bone parameter set matching the current face image from the reference model database according to the at least one key point feature.

In the embodiments of the present application, a preset number of face image samples may be obtained, and an image style of each face part in the face image samples may be manually annotated. Then, based on the annotated face image samples and the standard three-dimensional face model, a corresponding virtual three-dimensional face model is rendered by means of bone control. In the embodiments of the present application, the virtual three-dimensional face model rendered according to the face image samples and the standard three-dimensional face model is called the reference face model.

Exemplarily, assuming that there are 201 face image samples, the computer system correspondingly renders 201 reference face models, and generates the reference model database according to the relevant data of the 201 reference face models.

It should be noted here that an executive body that creates the reference model database and an executive body that creates a face model subsequently by applying the reference model database do not have to be the same computer system. For example, the executive body that creates the reference model database may be a cloud computer system, such as a cloud server, while the executive body of the above-mentioned steps 110 to 130 may be a computer system serving as a terminal device. Considering that the computing power of the current terminal device is continuously enhanced, and moreover, the embodiments of the present application do not require a large quantity of face image sample data, in another embodiment of the present application, the determination process of the reference model database and the subsequent face model creation process may both be executed by the computer system of the terminal device.

Figure 5:
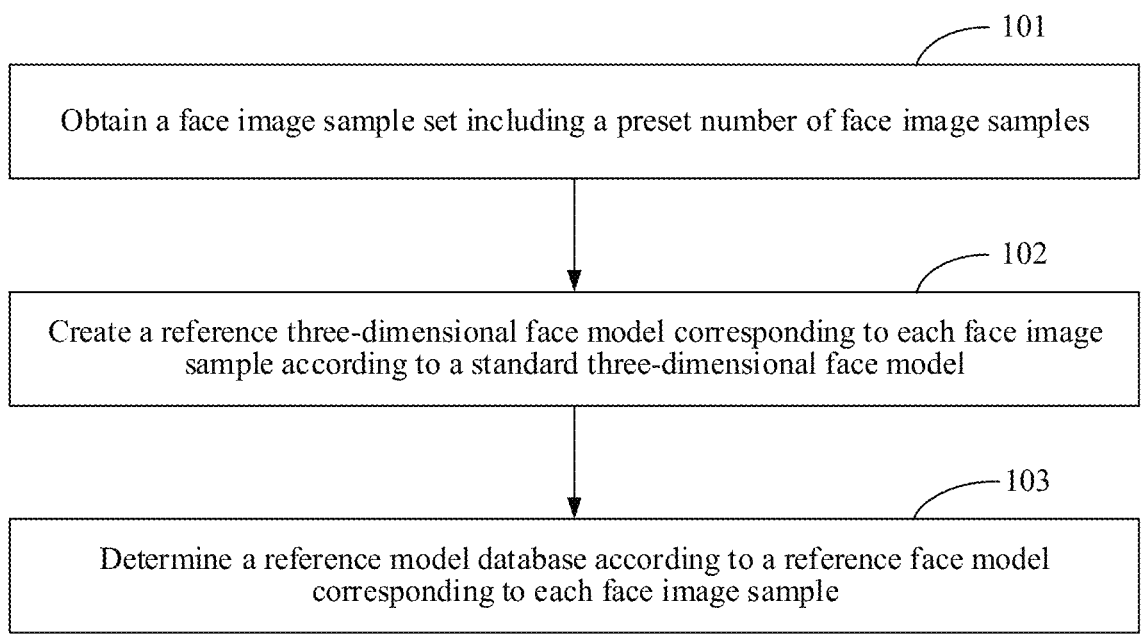
FIG. 5 is a flow chart of a method of creating a face model according to another exemplary embodiment of the present application.

Referring to FIG. 5, the above-mentioned step 100 may include the following steps.

At step 101, a face image sample set including a preset number of face image samples is obtained. The face image sample set includes a plurality of image styles representing at least one partial face region.

In the embodiments of the present application, the face image sample set may include a certain number of face image samples. The above-mentioned certain number of face image samples include, as comprehensive as possible, different image styles of face parts such as forehead, eyes, nose, and lips, in order to ensure that the reference model database rendered correspondingly includes as comprehensive reference data as possible, such as reference key point features and reference bone parameter sets.

With regard to the number of face image samples included in the face image sample set, the following conditions may be satisfied: for a randomly acquired two-dimensional face image A, image styles corresponding to different partial face regions in the above-mentioned image A may be found from the image styles of all face parts included in the above-mentioned face image sample set; alternatively, the image styles of different partial face regions such as the five sense organ parts are selectively extracted from the above-mentioned certain number of face image samples, so that a face image similar to the above-mentioned image A may be roughly pieced together.

In the embodiments of the present application, a certain number of face image samples may be collected according to common types of the five sense organs existing in the real world to obtain a face image sample set.

In one embodiment of the present application, 201 face image samples are collected for determining the above-mentioned face image sample set according to the styles of eyebrows, eyes, noses, mouths, and face contours of different persons in the real world. The 201 face image samples may include a plurality of image styles of each partial face region. The partial face regions refer to regions such as an eyebrow region, an eye region, a nose region, and a face contour recognized from the two-dimensional face image.

For example, the 201 face image samples include 12 eyebrow shapes corresponding to the eyebrow region shown in FIG. 2 above. By analogy, the 201 face image samples include a plurality of image styles respectively corresponding to the partial face regions such as the mouth, eyes, nose, and face contour.

At step 102, a reference three-dimensional face model corresponding to each face image sample is created according to a standard three-dimensional face model.

In the embodiments of the present application, a virtual three-dimensional face model created for each face image sample is referred to as the reference three-dimensional face model. Each reference three-dimensional face model corresponds to a group of bone control parameter sets.

Figure 6:
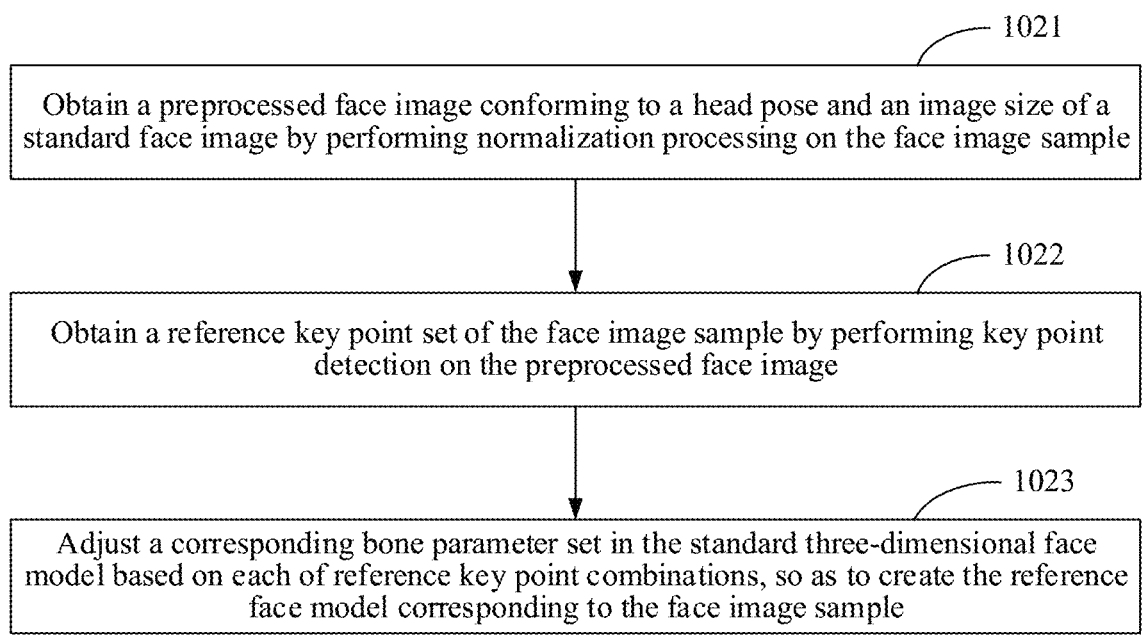
FIG. 6 is a flow chart of a method of creating a face model according to another exemplary embodiment of the present application.

For how to create a reference three-dimensional face model based on the standard three-dimensional face model and the face image sample, reference may be made to FIG. 6. The above-mentioned step 102 may include the following steps.

At step 1021, a preprocessed face image conforming to a head pose and an image size of the standard face image is obtained by performing normalization processing on the face image sample. The standard face image is a two-dimensional face image corresponding to a standard three-dimensional face model.

In the present application, in an establishment stage of the reference model database, normalization processing such as face region detection, head pose correction, and image scaling may be performed for each face image sample, to obtain the preprocessed face image conforming to the head pose and the image size of the standard face image. The preprocessed face image and the standard face image can be understood as face images which are respectively acquired by a same camera using the same image acquisition parameters for two persons with the same object distances and the same head pose.

The standard face image may be understood as a projection image of the standard three-dimensional face model in a preset image coordinate system. Alternatively, the standard three-dimensional face model is a virtual three-dimensional face model created by a computer system according to the obtained key point set, such as 240 key point position coordinates, and a preset number of bones, such as 61 bones, after performing key point detection on the standard face image.

At step 1022, a reference key point set of the face image sample is obtained by performing key point detection on the preprocessed face image, where the reference key point set includes reference key point combinations representing all the partial face regions in the face image sample.

After the preprocessed face image is obtained, any key point detection method well known to a person skilled in the art may be used to extract a preset number of key points, such as 68 key points, 106 key points, or 240 key points, from the preprocessed face image. The greater the number of extracted key points is, the more detailed expression of the partial face region may be achieved.

In the process of performing key point detection on the face region image, preset algorithms such as an edge detection robert algorithm and a sobel algorithm may be used; key point detection may also be performed through related models such as an active contour snake model.

Figure 7:
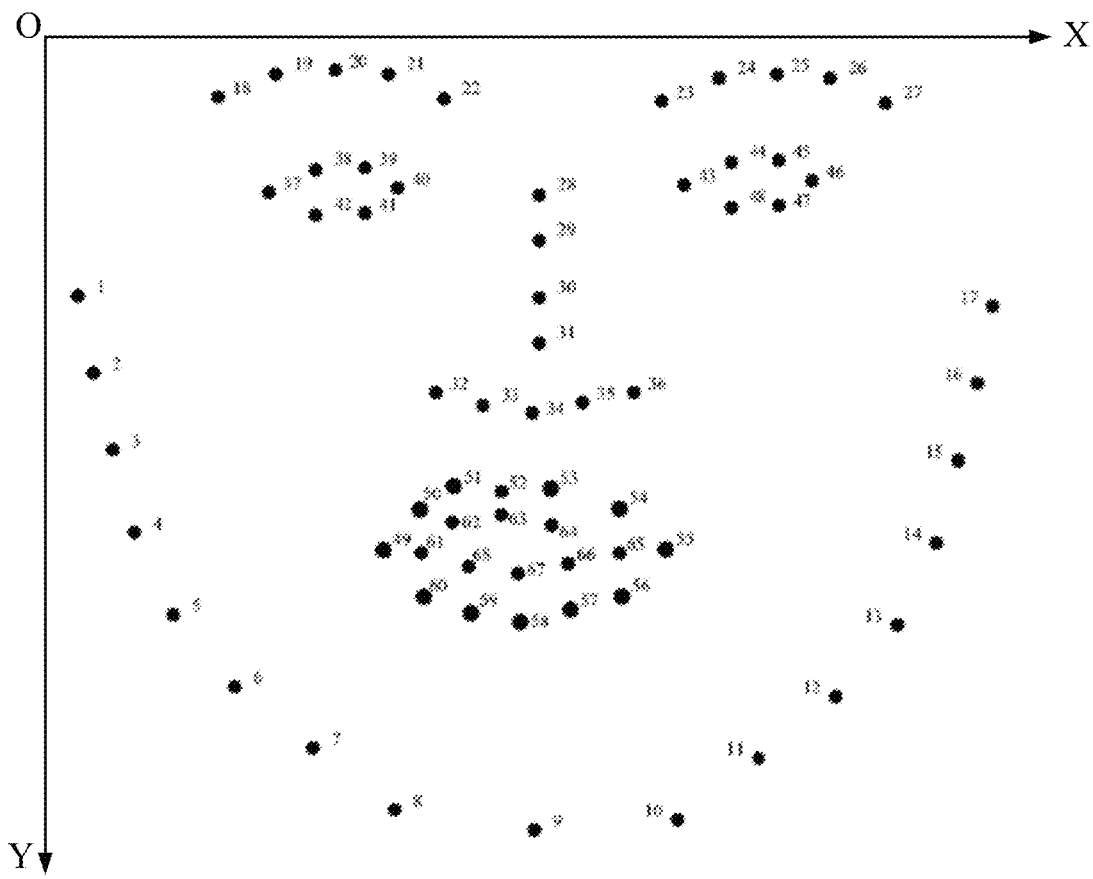
FIG. 7 is a schematic diagram of an application scenario for creating a face model according to another exemplary embodiment of the present application.

In another embodiment of the present application, it is possible to perform key point localization through a neural network configured to perform face key point detection. It is also possible to perform face key point detection through a third-party application, for example, to perform face key point localization through a third-party toolkit Dlib, so that 68 face key points are detected, as shown in FIG. 7. Further, it is also possible to use 240 face key point location technology to locate the position coordinates of 240 key points, thereby implementing the localization of detailed features of key parts, such as eyebrows, eyes, nose, lips, face contour, and face expression, in the current face image and/or face image sample.

For each of the reference key point combinations, in another embodiment of the present application, the serial number of each reference key point may be determined according to a preset rule, and the reference key point combination representing each partial face region may be determined. For example, in the examples shown in FIG. 7, 68 key points are extracted from the face image sample; the reference key point combination consisting of no. 18-22 reference key points represents the left eyebrow region. By analogy, different key point combinations are used to represent different partial face regions.

In the present application, the information of each key point includes a serial number and a coordinate position. For different face image samples, the serial numbers and the number of key points representing the same partial face region are the same, but the coordinate positions of the key points are different. As shown in the above examples, a combination of no. 18-22 key points extracted from the standard face image also represents the left eyebrow region in the standard face image, but the coordinate position of each key point is different from the coordinate positions of the no. 18-22 key points in the example shown in FIG. 7.

It should be noted here that the coordinate position of the key point refers to the position of the key point in a preset image coordinate system such as an XOY coordinate system shown in FIG. 7. Because the preprocessed face images have the same size, for each preprocessed face image, the same image coordinate system may be used to represent the position coordinates of key points in different preprocessed face images, so as to facilitate subsequent distance calculation.

At step 1023, a corresponding bone parameter set in the standard three-dimensional face model is adjusted based on each of the reference key point combinations, so as to create the reference face model corresponding to the face image sample. In this way, the reference face model corresponding to the face image sample includes the reference bone parameter set corresponding to the face image sample. In other words, the reference bone parameter set may be configured to render a reference face model of the face image sample.

In the embodiments of the present application, the system is present with a mapping relationship between key point combinations and bones. The mapping relationship may represent which bone parameter set need to be adjusted when a partial face region characterized by the key point combination in the corresponding three-dimensional face model is rendered.

Exemplarily, assuming that the nose region in the standard three-dimensional face model involves three bones, which may be represented as G1 to G3, then, by adjusting the parameters of the above-mentioned three bones, it is possible to determine that the creation of the three-dimensional model of the nose part is completed when the rendered three-dimensional model of the nose is approximate to the shape of the nose in the face image sample. Accordingly, bone control parameters of the current three bones are the reference bone parameter set corresponding to the image style of the nose in the face image sample.

By analogy, when the rendered virtual three-dimensional face model satisfies the expectation of a user by adjusting the bone parameter set of each partial face region, the creation of the reference face model is completed. Moreover, the reference bone parameter set corresponding to each reference key point combination in the current face image sample, i.e., the reference bone parameter set corresponding to the image style of each partial face region in the face image sample may be determined, to obtain reference face model data corresponding to the current face image sample. The reference face model data may include the correspondence between the reference key point combination of each partial face region and the reference bone parameter set.

In the embodiments of the present application, after the virtual three-dimensional face model, i.e., the reference face model, is successfully created for one face image sample, the reference face model data corresponding to one face image sample may be obtained according to the correspondence between the reference key point combination representing each partial face region and the reference bone parameter set.

The above-mentioned steps 1021 to 1023 describe the process of creating a corresponding reference face model based on one face image sample.

At step 103, the reference model database is determined according to the reference face model corresponding to each face image sample. The reference model database includes a correspondence between the reference key point feature of each image style representing each partial face region and the reference bone parameter set.

In the embodiments of the present application, the reference face model corresponding to each face image sample may be created according to the method shown in FIG. 6, and then the reference face model data corresponding to each face image sample may be determined.

The reference model database may be established after the reference face model data for each face image sample is obtained. The reference model database may include the correspondence between the reference key point combination representing the image style of each partial face region and the reference bone parameter set, the reference key point feature data of each face image sample, and the reference bone parameter set of each reference face model. It should be noted that in an approach of creating a model based on bones, the bones have a parent-child bone relationship. When a parent bone moves, it will drive child bones to move; similarly, the bone movement of the wrist will drive the bones of the palm to move. The adjustment of the bone parameter set of one partial face region may be associated with the adjustment parameters of other bones in the whole face model. Therefore, in the embodiments of the present application, a group of reference bone parameter sets corresponding to the whole reference face model is taken for data storage in the reference model database.

The above describes in detail how to build a reference model database.

In an actual application stage, the computer system performs key point detection on the input current face image, automatically retrieves, after obtaining key point features, the reference model database according to the key point features of the current face image, and matches the target bone parameter sets of different partial face regions from the reference model database.

Figure 8:
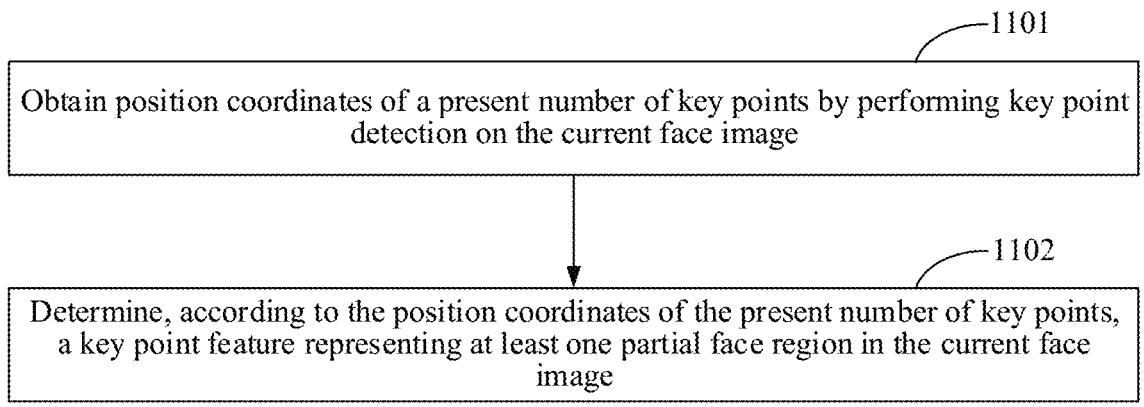
FIG. 8 is a flow chart of a method of creating a face model according to another exemplary embodiment of the present application.

For the implementation of the above-mentioned step 110, referring to FIG. 8, the above-mentioned step 110 may include the following steps.

At step 1101, position coordinates of a present number of key points are obtained by performing key point detection on the current face image.

As stated above, the computer system may perform normalization processing on the current face image, including performing processing such as face region detection, head pose correction, and image scaling on the current face image, in order to obtain a preprocessed image having the same size as the standard face image. Then, a face key point localization technology may be used to perform key point detection on the preprocessed image. For example, 240 face key point localization technologies may be used to perform key point detection on the preprocessed image to obtain the position coordinates of 240 face key points.

At step 1102, a key point feature representing at least one partial face region on the current face image is determined according to the position coordinates of the present number of key points.

In the embodiments of the present application, after the position coordinates of the key points of the current face image are obtained, the key point feature representing at least one partial face region in the current face image may be determined.

For one partial face region, such as an eyebrow region, the key point feature thereof may include at least two representation modes as follows.

Figures 1, 2, 3, 9:
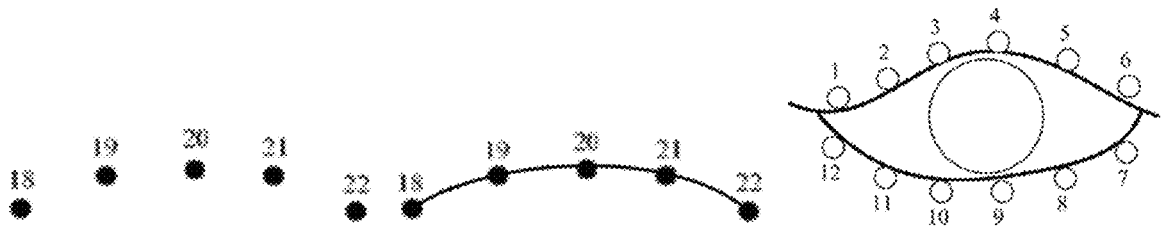

Mode 1: the key point feature of the partial face region is represented by using the position coordinate combination of the key points. For example, a key point coordinate combination representing one partial face region may be taken as the key point feature of the partial face region. As shown in FIG. 9-1, the coordinate position combination of the key points with serial numbers of 18-22 is determined as the key point feature of the left eyebrow region.

In the present application, relatively fixed key points (including the number of key points and the serial number of each key point) are used to represent the partial face region, but in different face images, the coordinate positions of the key points with the same serial number in the image coordinate system are different. For example, in the first face image, the coordinate position of the key point 18 is (80, 15), i.e., the position of the pixel located in the 80th row and 15th column. In the second face image, the coordinate position of the key point 18 may be (100, 20), i.e., the position of the pixel located in the 100th row and the 20th column. Therefore, the position coordinates of key point combinations may be used to effectively distinguish the face features of different persons.

Mode 2: the key point feature of the partial face region is represented by using a fitting curve of the key point coordinate combination. For example, a feature curve representing the partial face region may be fitted according to the key point coordinate combination representing one partial face region, and the feature curve may be taken as a key point feature of the partial face region. As shown in FIG. 9-2, the feature curve which is fitted according to the coordinate positions of the key points with serial numbers of 18-22 is taken as the key point feature of the left eyebrow region. Similarly, referring to FIG. 9-3, the eyelid feature curve is fitted according to the position coordinates of eye key points 1-12 as the key point feature of the left eye.

Since the position coordinates of the face key points of different persons are different, and the shapes of the curves which are fitted according to the key point position coordinates are also different. Therefore, the above-mentioned feature curve may be taken as the key point feature representing the partial face region in the current face image to distinguish faces of different persons.

Figure 10:
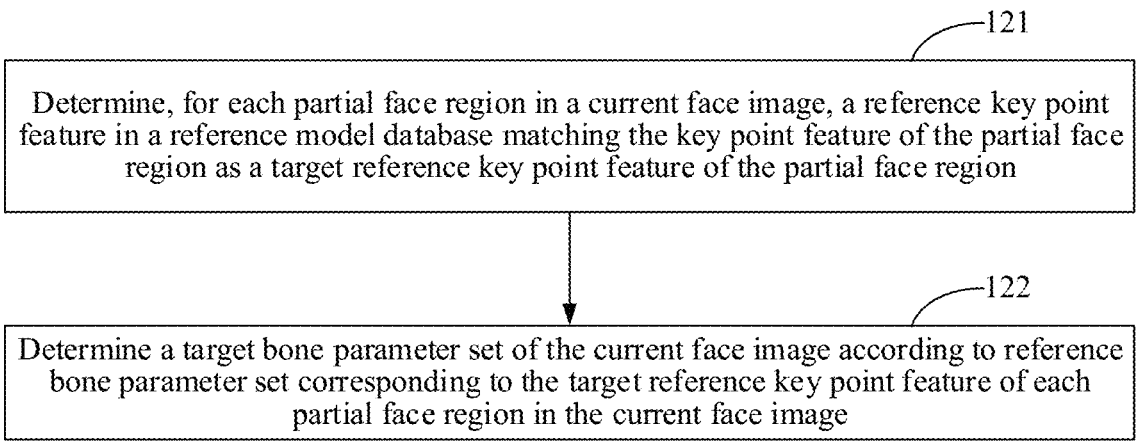
FIG. 10 is a flow chart of a method of creating a face model according to another exemplary embodiment of the present application.

For the implementation of the above step 120, the target bone parameter set matching the current face image may be found from the reference model database through the similarity between the key point features. Referring to FIG. 10, the above-mentioned step 120 may include the following steps.

At step 121, for each partial face region in the current face image, the reference key point feature in the reference model database matching the key point feature of the partial face region is determined as a target reference key point feature of the partial face region.

Figure 11:
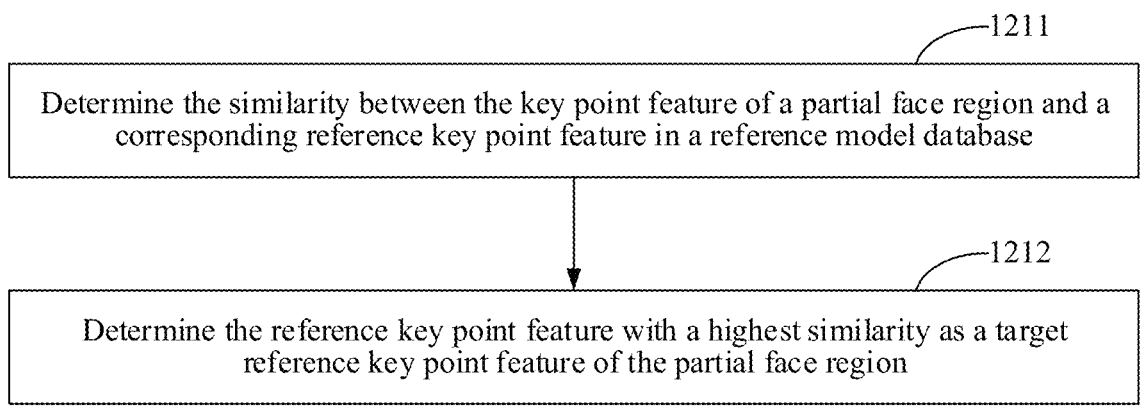
FIG. 11 is a flow chart of a method of creating a face model according to another exemplary embodiment of the present application.

Referring to FIG. 11, for each partial face region in the current face image, the above-mentioned step 121 may include the followings steps.

At step 1211, the similarity between the key point feature of the partial face region and a corresponding reference key point feature in the reference model database is determined. The corresponding reference key point feature in the reference model database may be a reference key point feature in the reference model database corresponding to the position of the partial face region.

In the embodiments of the present application, according to different expression forms of the key point features, different measurement approaches may be used to search for matched reference key point features from the reference model database.

For example, in a case that the reference key point features stored in the reference model database are reference key point coordinate combinations, the similarity between the key point feature of the partial face region and the reference key point feature may be determined according to the Euclidean distance between the key point coordinate combinations.

As shown in FIG. 9-1, the Euclidean distances between the position coordinates of the key points 18-22 in the current face image and the position coordinates of the key points 18-22 in any one face image sample may be calculated respectively, which are represented as l18, l19, l20, l21, and l22 respectively, where l18 represents the Euclidean distance between the position coordinate of the key point 18 in the current face image and the position coordinate of the key point 18 in the face image sample, and so on. The similarity between the left eyebrow regions in two images may be represent as the sum L of the Euclidean distances of key points 18-22. In one embodiment, L may be represented as:

$$L=l_{18}+l_{19}+l_{20}+l_{21}+l_{22}.$$

In another embodiment of the present application, the above-mentioned similarity may also be represented as a weighted value of the Euclidean distance between key points. Still as stated above, a preset weight may be set for each key point according to actual application scenarios, for example, if the weights respectively set for the key points 18-22 are $\alpha 1, \alpha 2, \alpha 3, \alpha 4$, and $\alpha 5$, then L may be represented as:

$$L=\alpha_1 *l_{18}+\alpha_2 *l_{19}+\alpha_3 *l_{20}+\alpha_4 *l_{21}+\alpha_5 *l_{22}.$$

The smaller the Euclidean distance between two key point coordinate combinations is, the higher the similarity between the partial face regions represented by the two key point coordinate combinations is.

Figure 12:
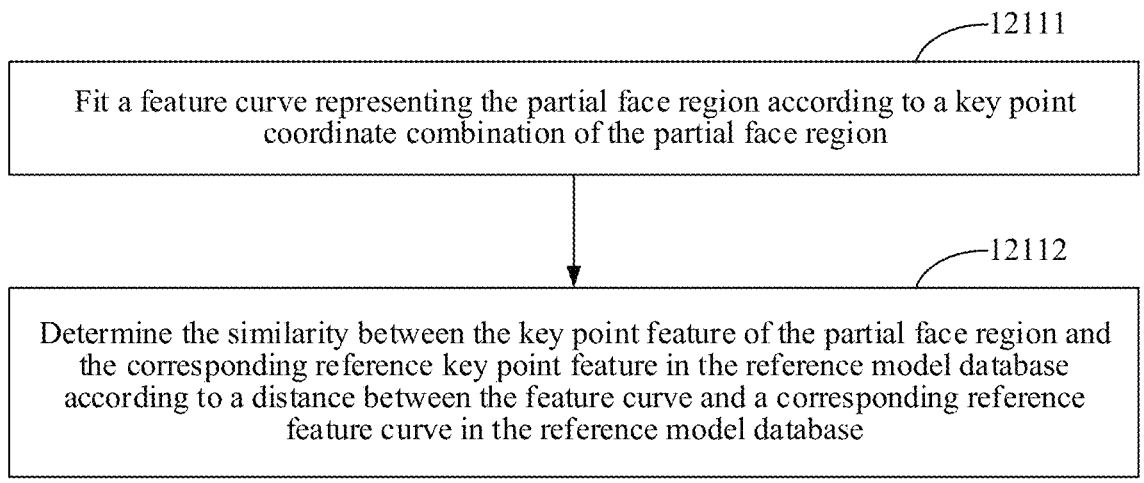
FIG. 12 is a flow chart of a method of creating a face model according to another exemplary embodiment of the present application.

In the case that the reference key point feature stored in the reference model database is the reference feature curve, referring to FIG. 12, the above-mentioned step 1211 may include the following steps.

At step 12111, a feature curve representing the partial face region is fitted according to the key point coordinate combination of the partial face region.

Still as shown in FIG. 9-1, the position coordinates of the key points 18-22 are determined from the current face image, one feature curve may be fitted according to a preset rule, such as in the order from left to right, as shown in FIG. 9-2.

At step 12112, the similarity between the key point feature of the partial face region and the corresponding reference key point feature in the reference model database is determined according to a distance between the feature curve and a corresponding reference feature curve in the reference model database.

In the embodiments of the present application, the frechet distance value may be used to measure the similarity between the key point features. The smaller the frechet distance value between the two feature curves is, the more similar the shapes of the two feature curves are, i.e., the higher the similarity is, correspondingly, the greater the similarity between the partial face regions respectively corresponding to the two feature curves is.

In another embodiment of the present application, a combination of the Euclidean distance and the frechet distance value may also be used to determine the target reference key point feature. Specifically, for the key point coordinate combination of any partial face region in the current face image, the Euclidean distance between this key point coordinate combination and each corresponding reference key point coordinate combination in the reference model database may be calculated separately. If at least two reference key point coordinate combinations existing in the reference model database have the same Euclidean distance value as the key point coordinate combination, the frechet distance value between each of the at least two reference key point coordinate combinations and the key point coordinate combination is further calculated, thereby effectively recognizing the target reference key point feature closest to the shape of the feature curve corresponding to the key point coordinate combination in the current face image.

In another embodiment of the present application, the similarity between the key point feature of the partial face region and the corresponding reference key point feature in the reference model database may also be determined according to distribution characteristic of the partial face region by using a corresponding policy.

Figure 13:
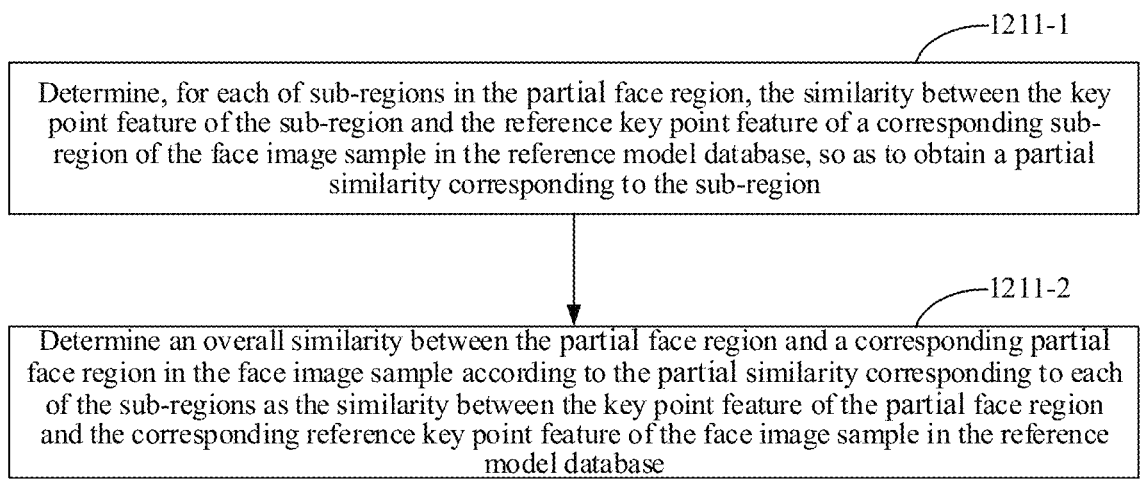
FIG. 13 is a flow chart of a method of creating a face model according to another exemplary embodiment of the present application.

For example, in the case that the partial face region includes at least two sub-regions, that is, the partial face region may be represented by the key point features of the at least two sub-regions, referring to FIG. 13, when determining the similarity between the key point feature of the partial face region and the reference key point feature corresponding to one face image sample in the reference model database, the above-mentioned step 1211 may include the following steps.

At step 1211-1, for each of the sub-regions in the partial face region, the similarity between the key point feature of the sub-region and the reference key point feature of a corresponding sub-region of the face image sample in the reference model database is determined, so as to obtain a partial similarity corresponding to the sub-region.

The corresponding sub-region of the face image sample refers to a sub-region in the face image sample corresponding to the position of a sub-region currently being processed in the partial face region. For example, the key point features of the eye region include key point features respectively corresponding to the left eye region and the right eye region. The key point features of the eyebrow region include key point features respectively corresponding to the left eyebrow region and the right eyebrow region. The key point features of the mouth region include key point features respectively corresponding to the upper lip region and the right lip region.

Taking the eye region as an example, the similarity between the key point feature of the left eye region and each left eye reference key point feature in the reference model database, and the similarity between the key point feature of the right eye region and each right eye reference key point feature in the reference model database may be determined according to any of the above methods. In the embodiments of the present application, the similarity between the key point feature of one sub-region and the reference key point feature of a corresponding sub-region in the reference model database is called the partial similarity. After comparing the key point features of the left and right eye regions in the current face image with the reference key point features of the left and right eye regions of one reference face model in the reference model database, a pair of partial similarities is obtained.

As in the above example, for the reference model database generated from 201 face image samples, 201 pairs of partial similarities are obtained for the key point feature of the eye region in the current face image.

At step 1211-2, an overall similarity between the partial face region and a corresponding partial face region in the face image sample is determined according to the partial similarity corresponding to each of the sub-regions as the similarity between the key point feature of the partial face region and the corresponding reference key point feature of the face image sample in the reference model database.

With regard to the partial face regions such as eyes, mouth, and eyebrows which may be represented by the key point features of the two sub-regions, after calculating the partial similarity corresponding to each sub-region, a sum or weighted sum of the two partial similarities may be calculated as the similarity between a partial region in the current face image and a corresponding region of one face image sample.

In the embodiments of the present application, for a case where the partial face region includes a plurality of sub-regions, the overall similarity of the partial face region such as the above-mentioned eyes, eyebrows, and mouth may be more accurately compared based on the partial similarities of multiple sub-regions, thereby determining the target bone parameter set of the partial face region from the reference model database more accurately.

At step 1212, the reference key point feature with a highest similarity is determined as the target reference key point feature of the partial face region.

According to any one method described in the above-mentioned step 1211, the similarity between the key point feature of the partial face region in the current face image and the corresponding reference key point feature of each face image sample in the reference model database is respectively calculated, and the reference key point feature with the highest similarity is determined as the target reference key point feature of the partial face region in the current face image.

At step 122, the target bone parameter set of the current face image is determined according to the reference bone parameter set corresponding to the target reference key point feature of each partial face region in the current face image.

In one embodiment of the present application, the reference model database stores the reference key point features, each of the reference key point features corresponds to one image style of each partial face region, and the correspondence between the above-mentioned reference key point feature and the reference bone parameter set.

Assuming that M partial face regions may be divided from each face image, for example, 5 partial face regions, which are eyebrows, eyes, nose, mouth, and face contour, respectively.

If the number of image styles corresponding to one partial face region is n, then at least N reference key point features are stored in the above-mentioned reference model database, $N=n1+n2+\ldots+nM$, where ni represents the number of the image styles of the partial face region, i is an identifier of one partial face region, and $i \in (1, M)$. Exemplarily, assuming that number 1 identifies the eyebrows, n1 represents the number of the eyebrow shapes, corresponding to the example shown in FIG. 2, $n1=12$.

Each reference key point feature corresponds to a reference bone parameter set. Therefore, at least N reference bone parameter sets corresponding to the N reference key point features are stored in the reference model database.

If the reference key point feature is a reference feature curve which is fitted according to the coordinate positions of the reference key points, then at least N reference bone parameter sets corresponding to the N reference feature curves are stored in the reference model database.

If the above-mentioned reference key point feature is the coordinate position combination of the reference key points, i.e., the reference key point coordinate combination, at least N reference bone parameter sets corresponding to the N reference key point coordinate combinations are stored in the reference model database.

After obtaining a key point feature of a partial face region from a current face image, the computer system may determine a reference key point feature in a reference model database matching, for example, the most similar to, the key point feature as a target reference key point feature, and then determine a target bone parameter set applicable to the key point feature according to a reference bone parameter set corresponding to the target reference key point feature. For example, the reference bone parameter set corresponding to the target reference key point feature are directly determined as the target bone parameter set applicable to the partial face region corresponding to the key point feature in the current face image.

In the embodiments of the present application, by measuring the similarity between the key point feature of the partial face region in the current face image and the corresponding reference key point feature in the reference model database by using the Euclidean distance or frechet distance in combination with the expression mode of the key point feature, the target bone parameter set of the partial face region in the current face image may be determined relatively accurately and quickly based on the reference model database, and bone adjustment parameters of a face model to be created may be determined, thereby effectively improving the user experience of a face kneading application in a preset application scene such as a game scene.

The embodiments in the specification are all described in a progressive manner, for same or similar parts in the embodiments, refer to these embodiments, and each embodiment focuses on a difference from other embodiments. In particular, data processing device embodiments are substantially similar to method embodiments and therefore are only described briefly, and for the associated part, refer to the descriptions of the method embodiments.

For ease of description, the foregoing method embodiments are all expressed as a series of action combinations. However, a person skilled in the art should know that the present disclosure is not limited by the order of actions described because certain steps may be executed in any other order or simultaneously according to the present disclosure.

Furthermore, a person skilled in the art should also know that the embodiments described in the specification are preferred embodiments, and the involved actions and modules are not necessarily required by the present disclosure.

Corresponding to the foregoing application function implementation method embodiments, the present disclosure also provides embodiments of an application function implementation apparatus and a corresponding terminal.

Figure 14:
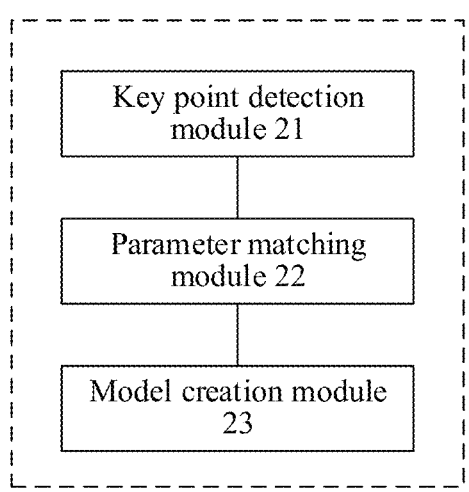
FIG. 14 is a block diagram of an apparatus of creating a face model according to one exemplary embodiment of the present application.

Correspondingly, the embodiments of the present application provide an apparatus of creating a face model. Referring to FIG. 14, the apparatus includes: a key point detection module 21, configured to obtain, by performing key point detection on a current face image, at least one key point feature of the current face image; a parameter matching module 22, configured to obtain a target bone parameter set matching the current face image according to the at least one key point feature; and a model creation module 23, configured to create a virtual three-dimensional face model corresponding to the current face image according to the target bone parameter set and a standard three-dimensional face model.

In one apparatus embodiment of the present application, the virtual three-dimensional face model corresponding to the current face image output by the model creation module 23 may be a cartoon virtual three-dimensional face model corresponding to the current face image.

In another apparatus embodiment of the present application, the virtual three-dimensional face model corresponding to the current face image output by the model creation module 23 may also be a virtual three-dimensional face model similar to an actual face in the current face image, i.e., a virtual three-dimensional face model that is realistic to a real face.

Figure 15:
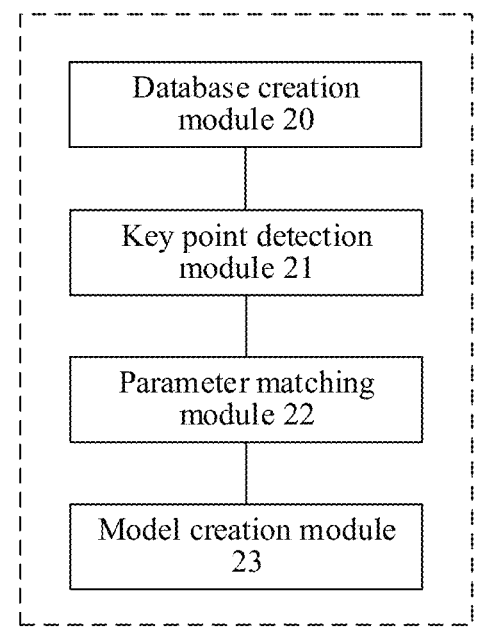
FIG. 15 is a block diagram of an apparatus of creating a face model according to another exemplary embodiment of the present application.

Referring to FIG. 15, on the basis of the apparatus embodiment shown in FIG. 14, the apparatus may further include: a database creation module 20, configured to determine a reference model database according to a preset number of face image samples and the standard three-dimensional face model. The reference model database includes at least one reference key point feature determined from a preset number of face image samples and at least one reference bone parameter set, each of the at least one reference key point feature corresponds to one of the at least one reference bone parameter set. In this case, the parameter matching module 22 is specifically configured to: obtain the target bone parameter set matching the current face image from the reference model database according to the at least one key point feature.

Figure 16:
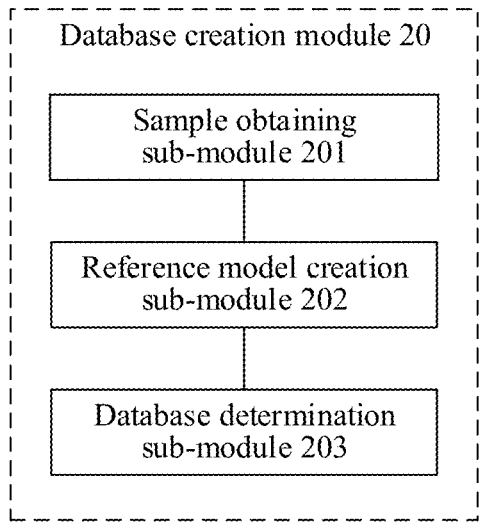
FIG. 16 is a block diagram of an apparatus of creating a face model according to another exemplary embodiment of the present application.

Referring to FIG. 16, on the basis of the apparatus embodiment shown in FIG. 15, the database creation module 20 may include: a sample obtaining sub-module 201, configured to obtain a face image sample set comprising the preset number of face image samples, wherein the face image sample set includes a plurality of image styles representing at least one partial face region; a reference model creation sub-module 202, configured to create, for each of the face image samples, a reference face model corresponding to the face image sample according to the standard three-dimensional face model, where the reference face model includes the at least one reference bone parameter set corresponding to the face image sample; and a database determination sub-module 203, configured to determine the reference model database according to the reference face model corresponding to each of the face image samples, wherein the reference model database includes a correspondence between the reference key point feature of each of the image styles representing each of the partial face regions and the reference bone parameter set.

Figure 17:
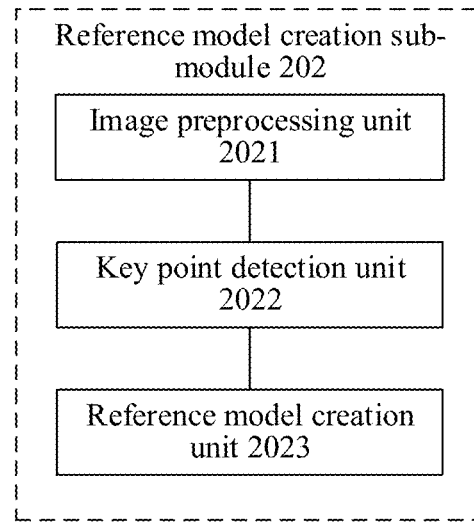
FIG. 17 is a block diagram of an apparatus of creating a face model according to another exemplary embodiment of the present application.

Referring to FIG. 17, on the basis of the apparatus embodiment shown in FIG. 16, the reference model creation sub-module 202 may include: an image preprocessing unit 2021, configured to obtain, by performing normalization processing on one of the face image samples, a preprocessed face image conforming to a head pose and an image size of a standard face image, wherein the standard face image is a two-dimensional face image corresponding to the standard three-dimensional face model; a key point detection unit 2022, configured to obtain, by performing key point detection on the preprocessed face image, a reference key point set of the face image sample, wherein the reference key point set includes reference key point combinations representing all the partial face regions in the face image sample; and a reference model creation unit 2023, configured to adjust a corresponding bone parameter set in the standard three-dimensional face model based on each of the reference key point combinations, so as to create the reference face model corresponding to the face image sample.

Figure 18:
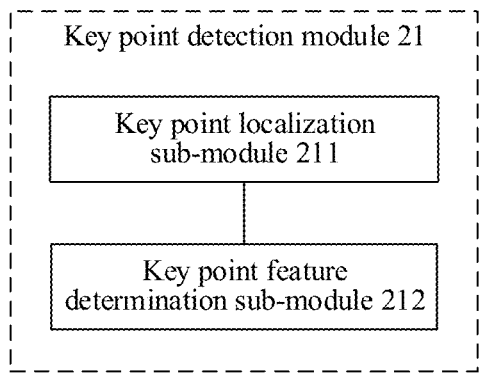
FIG. 18 is a block diagram of an apparatus of creating a face model according to another exemplary embodiment of the present application.

Referring to FIG. 18, on the basis of the apparatus embodiment shown in any one of FIG. 14 to FIG. 17, the key point detection module 21 may include: a key point localization sub-module 211, configured to obtain, by performing key point detection on the current face image, position coordinates of a present number of key points; and a key point feature determination sub-module 212, configured to determine, according to the position coordinates of the present number of key points, a key point feature representing at least one partial face region in the current face image.

In the embodiments of the present application, the key point feature may include a key point coordinate combination, and/or a feature curve.

Figure 19:
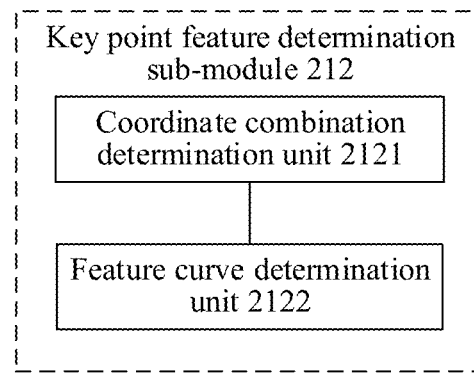
FIG. 19 is a block diagram of an apparatus of creating a face model according to another exemplary embodiment of the present application.

Correspondingly, referring to FIG. 19, on the basis of the apparatus embodiment shown in FIG. 18, the key point feature determination sub-module 212 may include: a coordinate combination determination unit 2121, configured to determine, based on the position coordinates of the present number of key points, a key point coordinate combination representing a first partial face region in the current face image as the key point feature representing the first partial face region, wherein the first partial face region is any one of the at least one partial face region; and a feature curve determination unit 2122, configured to fit, according to the key point coordinate combination representing the first partial face region, a feature curve representing the first partial face region as the key point feature representing the first partial face region.

In the present application, the at least one partial human face region includes at least one of the following: eyebrows, eyes, nose, mouth, or face contour.

The apparatus embodiment shown in FIG. 19 corresponding to a case where the key point feature determination sub-module 212 includes the coordinate combination determination unit 2121 and the feature curve determination unit 2122. In another apparatus embodiment of the present application, the key point feature determination sub-module 212 includes the coordinate combination determination unit 2121 or the feature curve determination unit 2122.

Figure 20:
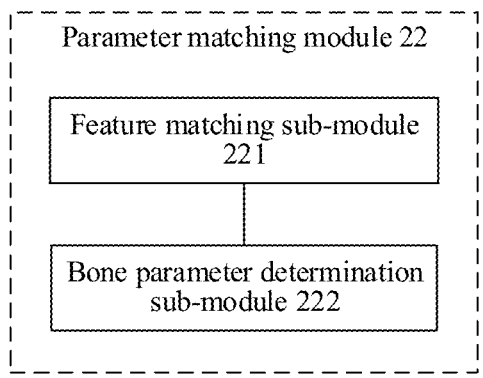
FIG. 20 is a block diagram of an apparatus of creating a face model according to another exemplary embodiment of the present application.

Referring to FIG. 20, on the basis of the apparatus embodiment shown in any one of FIGS. 14 to 19, the parameter matching module 22 may include: a feature matching sub-module 221, configured to determine, for each partial face region in the current face image, a reference key point feature in the reference model database matching a key point feature of the partial face region as a target reference key point feature of the partial face region; and a bone parameter determination sub-module 222, configured to determine the target bone parameter set of the current face image according to the reference bone parameter set corresponding to the target reference key point feature of each the partial face region in the current face image.

Figure 21:
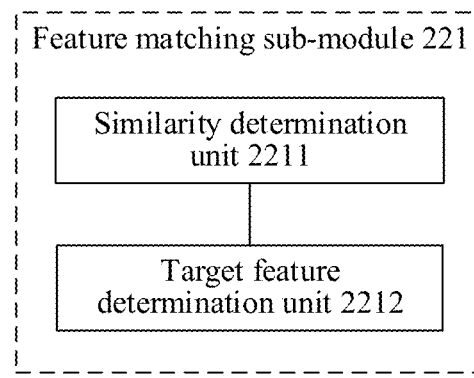
FIG. 21 is a block diagram of an apparatus of creating a face model according to another exemplary embodiment of the present application.

Referring to FIG. 21, on the basis of the apparatus embodiment shown in FIG. 20, the feature matching sub-module 221 may include: a similarity determination unit 2211, configured to determine a similarity between the key point feature of the partial face region and a corresponding reference key point feature in the reference model database; and a target feature determination unit 2212, configured to determine the reference key point feature with a highest similarity as the target reference key point feature of the partial face region.

Figure 22:
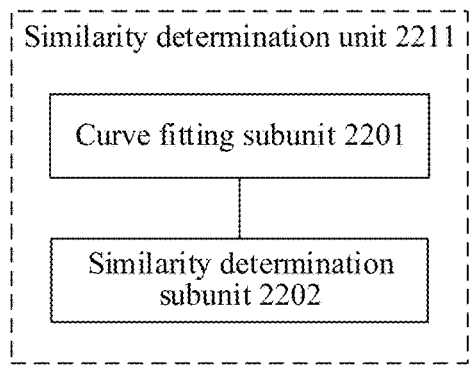
FIG. 22 is a block diagram of an apparatus of creating a face model according to another exemplary embodiment of the present application.

In one apparatus embodiment of the present application, the key point feature may be a feature curve fitted according to key point position coordinates. Accordingly, referring to FIG. 22, on the basis of the apparatus embodiment shown in FIG. 21, the similarity determination unit 2211 may include: a curve fitting subunit 2201, configured to fit a feature curve representing the partial face region according to the key point coordinate combination of the partial face region; and a similarity determination subunit 2202, configured to determine the similarity between the key point feature of the partial face region and the corresponding reference key point feature in the reference model database according to a distance between the feature curve and a corresponding reference feature curve in the reference model database.

In the embodiments of the present application, the distance may include Euclidean distance or frechet distance. Correspondingly, the target feature determination unit 2212 may be configured to determine the reference feature curve with the smallest distance value as the target reference key point feature.

Figure 23:
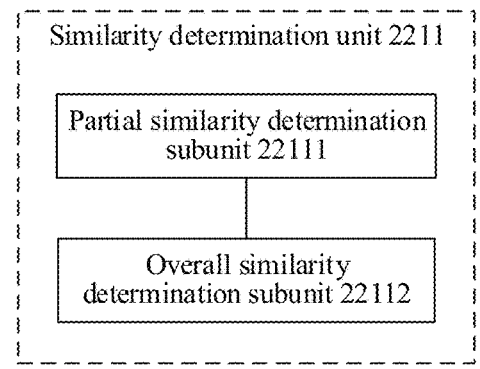
FIG. 23 is a block diagram of an apparatus of creating a face model according to another exemplary embodiment of the present application.

Referring to FIG. 23, on the basis of the apparatus embodiment shown in FIG. 21, the similarity determination unit 2211 may include: a partial similarity determination subunit 22111, configured to determine, in a case that the partial face region includes at least two sub-regions, for each of the sub-regions in the partial face region and for each face image sample in the reference model database, the similarity between the key point feature of the sub-region and the reference key point feature of a corresponding sub-region of the face image sample in the reference model database, so as to obtain a partial similarity corresponding to the sub-region; and an overall similarity determination subunit 22112, configured to determine, for each face image sample in the reference model database, an overall similarity between the partial face region and a corresponding partial face region in the face image sample as the similarity between the key point feature of the partial face region and the corresponding reference key point feature of the face image sample in the reference model database according to the partial similarity corresponding to each of the sub-regions.

Because the apparatus embodiments basically correspond to the method embodiments, for related parts, reference may be made to a part of the description in the method embodiments. The apparatus embodiments described above are merely exemplary. The units described as separate parts may or may not be physically separate, and parts displayed as units may or may not be physical units, i.e., may be located in one position, or may be distributed on a plurality of network units. Some or all of the modules may be selected according to actual requirements to achieve the objectives of the solutions of the present application. A person of ordinary skill in the art may understand and implement the embodiments of the present invention without involving creative efforts.

Figure 24:
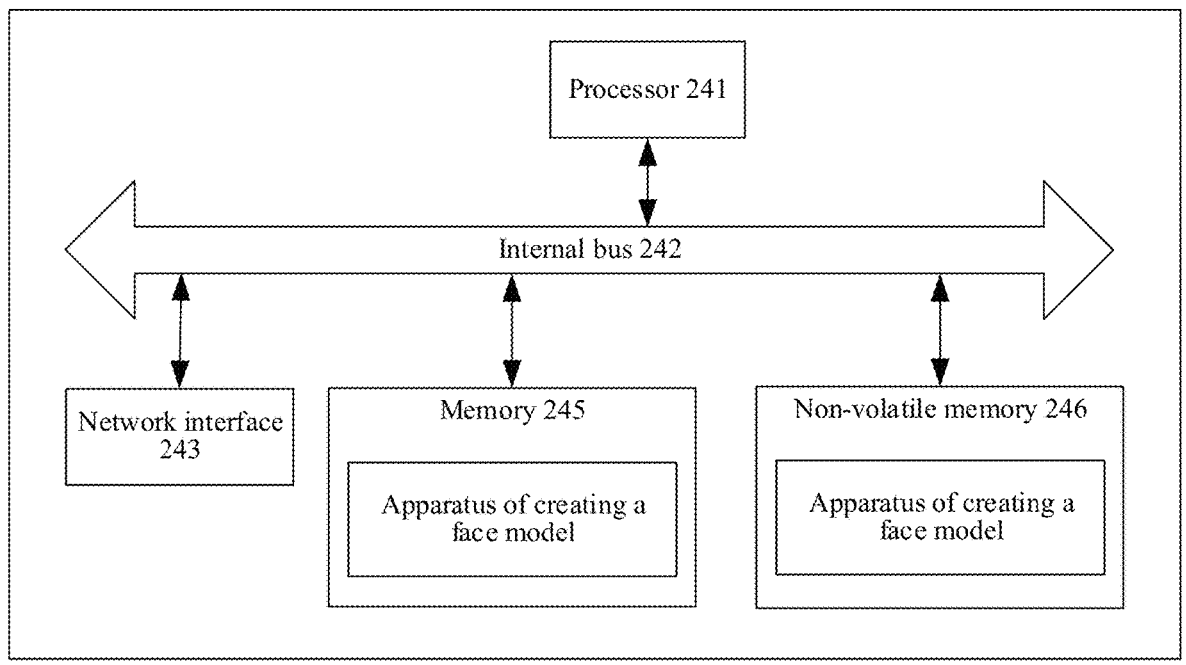
FIG. 24 is a schematic structural diagram of an electronic device according to another exemplary embodiment of the present application.

Corresponding to the above-mentioned method of creating a face model, the embodiments of the present application further provide a schematic structural diagram of an electronic device according to one exemplary embodiment of the present application. Referring to FIG. 24, at a hardware level, the electronic device includes a processor 241, an internal bus 242, a network interface 243, a memory 245, and a non-volatile memory 246, and certainly may further include hardware required for other services. The processor 241 reads a corresponding computer program from the non-volatile memory 246 into the memory 245 and then runs the computer program to form an intelligent driving control apparatus at a logical level. Certainly, in addition to the software implementation, the present application does not exclude other implementations, for example, implementations by logic devices or a combination of software and hardware, etc., that is, the executive body of the following processing flow is not limited to logic units, and may also be hardware or logic devices.

A person skilled in the art should understand that one or more embodiments of the description may provide a method, a system or a computer program product. Therefore, one or more embodiments of the description may take the forms of hardware embodiments, software embodiments, or embodiments in combination with software and hardware. Moreover, one or more embodiments of the description may use the form of the computer program product implemented over one or more computer usable storage media (including but not limited to a disk memory, a CD-ROM, and an optical memory, etc.) that include a computer usable program code.

The embodiments of the description further provide a computer-readable storage medium. The storage medium may have a computer program stored thereon. When the program is executed by a processor, steps of the method of creating a face model provided by any of the embodiments of FIGS. 1 to 13 of the description are implemented.

The embodiments of the subject matter and functional operations described in the description may be implemented in digital electronic circuitry, tangible computer software or firmware, computer hardware including the structures disclosed in the description and structural equivalents thereof, or a combination of one or more thereof. The embodiments of the subject matter described in the description may be implemented as one or more computer programs, i.e., one or more modules of computer program instructions encoded on a tangible non-transitory program carrier to be executed by a data processing apparatus or to control operations of the data processing apparatus. Alternatively or additionally, the program instructions may be encoded on artificially generated propagated signals, such as machine-generated electrical, optical or electromagnetic signals, generated to encode and transmit information to a suitable receiver apparatus for execution by the data processing apparatus. The computer storage medium may be a machine-readable storage device, a machine-readable storage substrate, a random or serial access memory device, or a combination of one or more thereof.

The processes and logic flows described in the description can be performed by one or more programmable computers executing one or more computer programs to perform corresponding functions by performing operations according to input data and generating output. The processes and logic flows may also be performed by a special logic circuit, such as a Field Programmable Gate Array (FPGA) or an Application Specific Integrated Circuit (ASIC), and the apparatus may also be implemented as a special logic circuit.

The computer suitable for executing the computer program includes, for example, a general-purpose microprocessor and/or a special-purpose microprocessor, any other type of central processing unit. Generally, the central processing unit receives instructions and data from a read-only memory and/or a random access memory. Basic components of the computer include a central processing unit for implementing or executing instructions and one or more memory devices for storing instructions and data. Generally, the computer further includes one or more large-capacity storage devices for storing data, for example, a magnetic disk, a magneto-optical disk, or an optical disk, or the computer is operably coupled to the large-capacity storage device to receives data therefrom or transmit data thereto, or receive data therefrom and transmit data therefrom. However, the computer does not necessarily include such a device. In addition, the computer may be embedded in another device, for example, a mobile phone, a PDA, a mobile audio or a video player, a game console, a Global Positioning System (GPS) receiver, or a portable storage device, for example, a Universal Serial Bus (USB) flash drive, just a few examples provided.

A computer-readable medium suitable for storing computer program instructions and data include a non-volatile memory, a medium, and a memory device in all forms, including, for example, a semiconductor memory device (for example, an EPROM, an EEPROM, and a flash device), a magnetic disk (for example, an internal hardware or a movable disk), a magneto-optical disk, and a CD ROM and DVD-ROM disk. The processor and the memory may be supplemented by the special logic circuit or incorporated into the special logic circuit Although the description include many specific implementation details, these should not be interpreted as limiting the scope of any invention or the scope of protection, and are mainly used for describing the features of specific embodiments of a specific invention. Some features described in multiple embodiments in the description may also be implemented in combination in a single embodiment. In addition, various features described in a single embodiment may be separately implemented in multiple embodiments or in any suitable sub-combination. Furthermore, although the features may function in some combinations as described above and even set forth in such a way initially, one or more features from a claimed combination may be removed from the combination in some cases, and the claimed combination may relate to a sub-combination or a modification of the sub-combination.

Similarly, although operations are described in the accompanying drawings in a specific order, this should not be understood as requiring that such operations are performed in the specific order shown or in a sequential order, or that all illustrated operations are performed to achieve a desired result. In some cases, multi-task and parallel processing may be advantageous. Furthermore, the separation of various system modules and components in the embodiments above should not be understood as requiring such separation in all embodiments, and it should be understood that the described program components and systems can generally be integrated together in a single software product or packaged into multiple software products.

Thus, specific embodiments of the subject matter have been described. Other embodiments are within the scope of the appended claims. In some cases, the actions described in the claims can be performed in a different order and still achieve the desired result. In addition, the processes described in the accompanying drawings do not necessarily require a specific order shown or a sequential order to achieve the desired result. In some implementations, multi-task and parallel processing may be advantageous.

The above descriptions are only preferred embodiments of one or more embodiments of the description and are not intended to limit one or more embodiments of the description. Any modifications, equivalent substitutions and improvements made without departing from the spirit and principle of one or more embodiments of the description are intended to be included within the scope of one or more embodiments of the description.

What is claimed is:

1. A method of creating a face model, comprising:
obtaining, by performing key point detection on a current face image, at least key point feature of the current face image;
obtaining a target bone parameter set matching the current face image according to the at least one key point feature;
creating a virtual three-dimensional face model corresponding to the current face image according to the target bone parameter set and a standard three-dimensional face model;
determining a reference model database, wherein the reference model database comprises at least one reference key point feature and at least one reference bone parameter set, each of the at least one reference key point feature corresponds to one of the at least one reference bone parameter set; and
obtaining the target bone parameter set matching the current face image according to the at least one key point feature comprises: obtaining the target bone parameter set matching the current face image from the reference model database according to the at least one key point feature;
wherein obtaining the target bone parameter set matching the current face image from the reference model database according to the at least one key point feature comprises:
determining, for each partial face region in the current face image, a reference key point feature in the reference model database matching a key point feature of the partial face region as a target reference key point feature of the partial face region; and
determining the target bone parameter set of the current face image according to the reference bone parameter set corresponding to the target reference key point feature of each partial face region in the current face image.

2. The method according to claim 1, wherein
determining the reference model database comprises:
determining the reference model database according to a preset number of face image samples and the standard three-dimensional face model, and wherein the at least one reference key point feature is determined from the preset number of face image samples.

3. The method according to claim 2, wherein determining the reference model database according to the preset number of face image samples and the standard three-dimensional face model comprises:
obtaining a face image sample set comprising the preset number of face image samples, wherein the face image sample set comprises a plurality of image styles representing at least one partial face region;
creating, for each of the face image samples, a reference face model corresponding to the face image sample according to the standard three-dimensional face model, wherein the reference face model comprises the at least one reference bone parameter set corresponding to the face image sample; and
determining the reference model database according to the reference face model corresponding to each of the face image samples,
wherein the reference model database comprises a correspondence between a reference key point feature of each of the image styles representing each of the at least one partial face region and the at least one reference bone parameter set.

4. The method according to claim 3, wherein creating the reference face model corresponding to the face image sample according to the standard three-dimensional face model comprises:
obtaining, by performing normalization processing on the face image sample, a preprocessed face image conforming to a head pose and an image size of a standard face image, wherein the standard face image is a two-dimensional face image corresponding to the standard three-dimensional face model;
obtaining, by performing the key point detection on the preprocessed face image, a reference key point set of the face image sample, wherein the reference key point set comprises reference key point combinations representing the at least one partial face region in the face image sample; and
adjusting a corresponding bone parameter set in the standard three-dimensional face model based on each of the reference key point combinations, to create the reference face model corresponding to the face image sample.

5. The method according to claim 1, wherein obtaining, by performing key point detection on the current face image, at least one key point feature of the current face image comprises:
 obtaining, by performing key point detection on the current face image, position coordinates of a present number of key points; and
 determining, according to the position coordinates of the present number of key points, a key point feature representing at least one partial face region in the current face image.

6. The method according to claim 5, wherein determining, according to the position coordinates of the present number of key points, the key point feature representing at least one partial face region in the current face image comprises:
 determining, based on the position coordinates of the present number of key points, a key point coordinate combination representing a first partial face region in the current face image as a key point feature representing the first partial face region, wherein the first partial face region is one of the at least one partial face region; and/or
 fitting, according to the key point coordinate combination representing the first partial face region, a feature curve representing the first partial face region as the key point feature representing the first partial face region.

7. The method according to claim 1, wherein determining the reference key point feature in the reference model database matching the key point feature of the partial face region as the target reference key point feature of the partial face region comprises:
 determining a similarity between the key point feature of the partial face region and a corresponding reference key point feature in the reference model database; and
 determining the reference key point feature with a highest similarity as the target reference key point feature of the partial face region.

8. The method according to claim 7, wherein determining the similarity between the key point feature of the partial face region and the corresponding reference key point feature in the reference model database comprises:
 fitting a feature curve representing the partial face region according to a key point coordinate combination representing the partial face region; and
 determining the similarity between the key point feature of the partial face region and the corresponding reference key point feature in the reference model database according to a distance between the feature curve and a corresponding reference feature curve in the reference model database.

9. The method according to claim 7, wherein when the partial face region comprises at least two sub-regions, determining the similarity between the key point feature of the partial face region and the corresponding reference key point feature of one face image sample in the reference model database comprises:
 determining, for each of the at least two sub-regions in the partial face region, the similarity between the key point feature of the sub-region and the reference key point feature of a corresponding sub-region of the face image sample in the reference model database, to obtain a partial similarity corresponding to the sub-region; and
 determining, according to the partial similarity corresponding to each of the at least two sub-regions, an overall similarity between the partial face region and a corresponding partial face region in the face image sample as the similarity between the key point feature of the partial face region and the corresponding reference key point feature of the face image sample in the reference model database.

10. A non-transitory computer-readable storage medium storing a computer program, wherein the computer program is executed by a processor to cause the processor to perform operations comprising:
 determining a reference model database, wherein the reference model database comprises at least one reference key point feature and at least one reference bone parameter set, each of the at least one reference key point feature corresponds to one of the at least one reference bone parameter set;
 obtaining, by performing key point detection on a current face image, at least one key point feature of the current face image;
 obtaining a target bone parameter set matching the current face image according to the at least one key point feature; and
 creating a virtual three-dimensional face model corresponding to the current face image according to the target bone parameter set and a standard three-dimensional face model;
 wherein obtaining the target bone parameter set matching the current face image according to the at least one key point feature comprises: obtaining the target bone parameter set matching the current face image from the reference model database according to the at least one key point feature;
 wherein obtaining the target bone parameter set matching the current face image from the reference model database according to the at least one key point feature comprises:
 determining, for each partial face region in the current face image, a reference key point feature in the reference model database matching a key point feature of the partial face region as a target reference key point feature of the partial face region; and
 determining the target bone parameter set of the current face image according to the reference bone parameter set corresponding to the target reference key point feature of each partial face region in the current face image.

11. An electronic device, comprising:
a memory;
a processor; and
a computer program stored on the memory and executable by the processor, wherein the program is executed by the processor to cause the processor to perform operations comprising:
 determining a reference model database, wherein the reference model database comprises at least one reference key point feature and at least one reference bone parameter set, each of the at least one reference key point feature corresponds to one of the at least one reference bone parameter set;
 obtaining, by performing key point detection on a current face image, at least one key point feature of the current face image;
 obtaining a target bone parameter set matching the current face image according to the at least one key point feature; and
 creating a virtual three-dimensional face model corresponding to the current face image according to the target bone parameter set and a standard three-dimensional face model;

wherein obtaining the target bone parameter set matching the current face image according to the at least one key point feature comprises: obtaining the target bone parameter set matching the current face image from the reference model database according to the at least one key point feature;

wherein obtaining the target bone parameter set matching the current face image from the reference model database according to the at least one key point feature comprises:

determining, for each partial face region in the current face image, a reference key point feature in the reference model database matching a key point feature of the partial face region as a target reference key point feature of the partial face region; and determining the target bone parameter set of the current face image according to the reference bone parameter set corresponding to the target reference key point feature of each partial face region in the current face image.

12. The electronic device according to claim 11, wherein the operations further comprise:

determining the reference model database according to a preset number of face image samples and the standard three-dimensional face model, and wherein the at least one reference key point feature is determined from the preset number of face image samples.

13. The electronic device according to claim 12, wherein the operations further comprise:

obtaining a face image sample set comprising the preset number of face image samples, wherein the face image sample set comprises a plurality of image styles representing at least one partial face region;

creating, for each of the face image samples, a reference face model corresponding to the face image sample according to the standard three-dimensional face model, wherein the reference face model comprises the at least one reference bone parameter set corresponding to the face image sample; and determining the reference model database according to the reference face model corresponding to each of the face image samples, wherein the reference model database comprises a correspondence between a reference key point feature of each of the image styles representing each of the at least one partial face region and the at least one reference bone parameter set.

14. The electronic device according to claim 13, wherein the operations further comprise:

obtaining, by performing normalization processing on the face image sample, a preprocessed face image conforming to a head pose and an image size of a standard face image, wherein the standard face image is a two-dimensional face image corresponding to the standard three-dimensional face model;

obtaining, by performing the key point detection on the preprocessed face image, a reference key point set of the face image sample, wherein the reference key point set comprises reference key point combinations representing the at least one partial face region in the face image sample; and adjusting a corresponding bone parameter set in the standard three-dimensional face model based on each of the reference key point combinations, so as to create the reference face model corresponding to the face image sample.

15. The electronic device according to claim 11, wherein the operations further comprise:

obtaining, by performing key point detection on the current face image, position coordinates of a present number of key points; and determining, according to the position coordinates of the present number of key points, a key point feature representing at least one partial face region in the current face image.

16. The electronic device according to claim 15, wherein the operations further comprise:

determining, based on the position coordinates of the present number of key points, a key point coordinate combination representing a first partial face region in the current face image as a key point feature representing the first partial face region, wherein the first partial face region is one of the at least one partial face region; and/or fitting, according to the key point coordinate combination representing the first partial face region, a feature curve representing the first partial face region as the key point feature representing the first partial face region.

17. The electronic device according to claim 11, wherein the operations further comprise:

determining a similarity between the key point feature of the partial face region and a corresponding reference key point feature in the reference model database; and determining the reference key point feature with a highest similarity as the target reference key point feature of the partial face region.

18. The electronic device according to claim 17, wherein the operations further comprise:

fitting a feature curve representing the partial face region according to a key point coordinate combination representing the partial face region; and determining the similarity between the key point feature of the partial face region and the corresponding reference key point feature in the reference model database according to a distance between the feature curve and a corresponding reference feature curve in the reference model database.

\* \* \* \* \*